US00RE50350E

(19) United States
(12) Reissued Patent
Nelson et al.

(10) Patent Number: US RE50,350 E
(45) Date of Reissued Patent: Mar. 25, 2025

(54) MAGNETIC COUPLING FOR SPRAYHEADS

(71) Applicant: Delta Faucet Company, Indianapolis, IN (US)

(72) Inventors: Alfred Charles Nelson, Westfield, IN (US); Christopher Michael McGuire, Fishers, IN (US)

(73) Assignee: Delta Faucet Company, Indianapolis, IN (US)

(21) Appl. No.: 16/850,681

(22) Filed: Apr. 16, 2020

Related U.S. Patent Documents

Reissue of:
(64) Patent No.: 10,072,401
Issued: Sep. 11, 2018
Appl. No.: 15/205,500
Filed: Jul. 8, 2016

U.S. Applications:
(60) Continuation of application No. 13/951,310, filed on Jul. 25, 2013, now Pat. No. 9,404,242, which is a continuation of application No. 12/650,330, filed on Dec. 30, 2009, now Pat. No. 8,496,028, which is a division of application No. 12/059,403, filed on Mar. 31, 2008, now Pat. No. 7,753,079, which is a continuation-in-part of application No. 11/393,450, filed on Mar. 30, 2006, now Pat. No. 7,909,061.

(60) Provisional application No. 60/691,389, filed on Jun. 17, 2005.

(51) Int. Cl.
*E03C 1/04* (2006.01)
*B05B 15/65* (2018.01)

(52) U.S. Cl.
CPC ..... *E03C 1/0404* (2013.01); *B05B 15/65* (2018.02); *E03C 1/04* (2013.01); *E03C 2001/0415* (2013.01); *Y10T 137/0402* (2015.04); *Y10T 137/598* (2015.04); *Y10T 137/9464* (2015.04)

(58) Field of Classification Search
CPC .. E03C 1/04; E03C 1/0404; E03C 2001/0415; B05B 15/65; Y10T 137/9464
See application file for complete search history.

(56) References Cited

U.S. PATENT DOCUMENTS

| | | | |
|---|---|---|---|
| 2,697,642 | A | 12/1954 | Rudy |
| 2,793,057 | A | 5/1957 | McGugin |
| 3,009,725 | A | 11/1961 | Koch |
| 3,050,646 | A | 8/1962 | Eddy et al. |
| 3,104,088 | A | 9/1963 | Cator |

(Continued)

FOREIGN PATENT DOCUMENTS

| | | |
|---|---|---|
| CN | 1319456 | 10/2001 |
| CN | 1319456 A | 10/2002 |

(Continued)

OTHER PUBLICATIONS

"Capture." The American Heritage Dictionary of the English Language. Harper Collins, https://www.ahdictionary.com/word/search.html?q=capture. Accessed May 10, 2024. (Year: 2022).*

(Continued)

*Primary Examiner* — Sara S Clarke
(74) *Attorney, Agent, or Firm* — Bose McKinney & Evans LLP

(57) ABSTRACT

A faucet including a faucet head, a body and a magnetic coupling releasably coupling the faucet head to the faucet body.

107 Claims, 23 Drawing Sheets

(56) References Cited

U.S. PATENT DOCUMENTS

| | | | |
|---|---|---|---|
| 3,181,895 | A | 5/1965 | Cator |
| 3,265,075 | A | 8/1966 | Edman et al. |
| 3,582,017 | A | 6/1971 | Zecca |
| 3,840,041 | A | 10/1974 | McMurray |
| 4,004,298 | A | 1/1977 | Freed |
| 4,049,295 | A | 9/1977 | Piers |
| 4,205,678 | A | 6/1980 | Adair |
| 4,232,695 | A | 11/1980 | Roberge |
| 4,304,256 | A | 12/1981 | Taiani |
| 4,384,703 | A | 5/1983 | Ruyak et al. |
| 4,427,960 | A | 1/1984 | Wuerfel |
| 4,651,720 | A | 3/1987 | Baus |
| 4,671,486 | A | 6/1987 | Giannini |
| 4,716,922 | A | 1/1988 | Camp |
| 4,718,131 | A | 1/1988 | Kitamura et al. |
| 5,025,510 | A | 6/1991 | Basile |
| 5,073,991 | A | 12/1991 | Marty |
| 5,096,230 | A | 3/1992 | Pausch et al. |
| 5,145,114 | A | 9/1992 | Meonch |
| 5,277,391 | A | 1/1994 | Haug et al. |
| 5,318,328 | A | 6/1994 | Dawson |
| 5,419,354 | A | 5/1995 | Krynicki |
| 5,645,302 | A | 7/1997 | Horimoto |
| 5,727,769 | A | 3/1998 | Suzuki |
| 5,758,690 | A | 6/1998 | Humpert et al. |
| 5,771,934 | A | 6/1998 | Warshawsky |
| 5,911,240 | A | 6/1999 | Kolar et al. |
| 6,023,951 | A | 2/2000 | Maurer et al. |
| 6,220,297 | B1 * | 4/2001 | Marty ..... E03C 1/0404 4/678 |
| 6,370,713 | B2 | 4/2002 | Bosio |
| 6,387,096 | B1 | 5/2002 | Hyde, Jr. |
| 6,390,717 | B1 | 5/2002 | Bar |
| 6,446,278 | B1 | 9/2002 | Lin |
| 6,619,567 | B1 | 9/2003 | Ouyoung |
| 6,705,794 | B2 | 3/2004 | Varner et al. |
| 6,735,054 | B2 | 5/2004 | Ooi et al. |
| 6,738,996 | B1 * | 5/2004 | Malek ..... B05B 1/1618 4/677 |
| 6,757,921 | B2 | 7/2004 | Esche |
| 6,786,239 | B1 | 9/2004 | Welsh |
| 6,810,539 | B2 | 11/2004 | Bosio |
| 6,845,526 | B2 | 1/2005 | Malek et al. |
| 6,877,172 | B2 | 4/2005 | Malek et al. |
| 6,910,604 | B2 | 6/2005 | Gugliotti et al. |
| 6,938,837 | B2 | 9/2005 | Nelson et al. |
| 7,000,854 | B2 | 2/2006 | Malek et al. |
| 7,104,473 | B2 | 9/2006 | Bosio |
| 7,114,510 | B2 | 10/2006 | Peters et al. |
| 7,162,802 | B2 | 1/2007 | Benardeau et al. |
| 7,178,207 | B2 | 2/2007 | Wong et al. |
| 7,246,757 | B2 | 7/2007 | Juo |
| 7,252,112 | B1 | 8/2007 | Imler et al. |
| 7,487,796 | B2 | 2/2009 | Imler et al. |
| 7,520,105 | B2 | 4/2009 | Geller |
| 7,537,023 | B2 | 5/2009 | Marty et al. |
| 7,563,249 | B2 | 7/2009 | Schriver et al. |
| 7,669,899 | B2 | 3/2010 | Carson |
| 7,753,079 | B2 | 7/2010 | Nelson |
| 7,793,987 | B1 | 9/2010 | Busch et al. |
| 7,909,061 | B2 | 3/2011 | Nelson |
| 8,387,661 | B2 | 3/2013 | Nelson |
| 8,496,028 | B2 | 7/2013 | Nelson et al. |
| 8,875,738 | B2 | 11/2014 | Yang et al. |
| 9,181,685 | B2 | 11/2015 | Esche et al. |
| 9,315,975 | B2 | 4/2016 | Davidson et al. |
| 9,404,242 | B2 | 8/2016 | Nelson et al. |
| 10,072,401 | B2 | 9/2018 | Nelson et al. |
| 10,132,064 | B2 | 11/2018 | Myers et al. |
| 10,240,326 | B2 | 3/2019 | Nelson |
| 10,669,702 | B2 | 6/2020 | Nelson |
| 10,724,217 | B2 | 7/2020 | Nelson |
| 10,738,444 | B2 | 8/2020 | Nelson |
| 2002/0182974 | A1 | 12/2002 | Grabianski |
| 2003/0041372 | A1 | 3/2003 | Yang |
| 2003/0188381 | A1 | 10/2003 | Bosio |
| 2004/0010848 | A1 | 1/2004 | Esche |
| 2004/0135009 | A1 | 7/2004 | Malek et al. |
| 2004/0135010 | A1 | 7/2004 | Malek et al. |
| 2004/0144866 | A1 | 7/2004 | Nelson |
| 2004/0177880 | A1 | 9/2004 | Nelson |
| 2004/0254533 | A1 | 12/2004 | Schriver et al. |
| 2005/0015075 | A1 | 1/2005 | Wright |
| 2005/0028890 | A1 | 2/2005 | Sakaki et al. |
| 2005/0189438 | A1 | 9/2005 | Bosio |
| 2006/0130907 | A1 | 6/2006 | Marty et al. |
| 2006/0213585 | A1 | 9/2006 | Nakamura et al. |
| 2006/0283511 | A1 | 12/2006 | Nelson |
| 2007/0001018 | A1 | 1/2007 | Schmitt et al. |
| 2007/0022528 | A1 | 2/2007 | Gilbert |
| 2007/0170284 | A1 | 7/2007 | Nelson et al. |
| 2007/0247794 | A1 | 10/2007 | Jaffe |
| 2008/0143098 | A1 | 6/2008 | Zimmermann et al. |
| 2008/0185060 | A1 | 8/2008 | Nelson |
| 2008/0283083 | A1 | 11/2008 | Piao |
| 2009/0007330 | A1 | 1/2009 | Genord et al. |
| 2009/0146412 | A1 | 6/2009 | Schoenoff et al. |
| 2009/0302181 | A1 | 12/2009 | Glunk |
| 2010/0170587 | A1 | 7/2010 | Kaess |
| 2010/0170588 | A1 | 7/2010 | Nelson |
| 2010/0237166 | A1 | 9/2010 | Nelson |
| 2011/0162743 | A1 | 7/2011 | Nelson |
| 2014/0020767 | A1 | 1/2014 | Nelson et al. |
| 2014/0026980 | A1 | 1/2014 | Esche et al. |
| 2014/0069520 | A1 | 3/2014 | Esche et al. |
| 2019/0218755 | A1 | 7/2019 | Nelson |
| 2020/0087902 | A1 | 3/2020 | Nelson |
| 2020/0087903 | A1 | 3/2020 | Nelson |
| 2020/0332503 | A1 | 10/2020 | Nelson |

FOREIGN PATENT DOCUMENTS

| | | | |
|---|---|---|---|
| DE | 1 489 255 | | 8/1969 |
| DE | 1489255 | A1 | 8/1969 |
| DE | 40 00 621 | | 7/1991 |
| DE | 4000621 | A1 | 7/1991 |
| DE | 93 00 418 | U1 | 3/1993 |
| DE | 196 49 006 | | 5/1998 |
| DE | 19649006 | A1 | 5/1998 |
| DE | 201 17 761 | U1 | 3/2002 |
| DE | 10260 207 | | 6/2004 |
| DE | 10260207 | A1 | 6/2004 |
| DE | 202005013425 | U1 | 11/2005 |
| EP | 0 091 032 | | 10/1983 |
| EP | 0091032 | A2 | 10/1983 |
| EP | 1 350 895 | | 10/2003 |
| EP | 1350895 | A1 | 10/2003 |
| EP | 1 367 183 | | 12/2003 |
| EP | 1367183 | A2 | 12/2003 |
| EP | 2 042 663 | | 4/2009 |
| EP | 2042663 | A2 | 4/2009 |
| FR | 2 197 395 | | 3/1974 |
| GB | 2 285 919 | | 8/1995 |
| GB | 2285919 | A | 8/1995 |
| GB | 2 431 861 | | 5/2007 |
| GB | 2431861 | A | 5/2007 |
| JP | H02-62957 | A | 5/1990 |
| JP | H04-50466 | A | 4/1992 |
| JP | H05-148868 | A | 6/1993 |
| JP | H10-152871 | A | 6/1998 |
| JP | 2000-263060 | | 9/2000 |
| JP | 2000-263060 | A | 9/2000 |
| JP | 3078605 | B2 | 7/2001 |
| JP | 3078605 | U * | 7/2001 |
| JP | 2002-068270 | | 3/2002 |
| JP | 2002-068270 | A | 3/2002 |
| JP | 2002-223969 | | 8/2002 |
| JP | 2002-223969 | A | 8/2002 |
| JP | 2003-268824 | A | 9/2003 |
| JP | 2009-102921 | A | 5/2009 |
| KR | 20-0177895 | Y1 | 4/2000 |
| KR | 2000-0023502 | A | 5/2002 |
| NL | 1028853 | | 10/2006 |
| NL | 1028853 | C1 | 10/2006 |

(56) References Cited

FOREIGN PATENT DOCUMENTS

| | | | | |
|---|---|---|---|---|
| WO | 2004/008581 | A1 | 1/2004 | |
| WO | 2005/026457 | A1 | 3/2005 | |
| WO | WO 2005/026457 | | 3/2005 | |
| WO | WO-2007019718 | A1 * | 2/2007 | ..... E03C 1/025 |
| WO | 2008/107101 | A1 | 9/2008 | |
| WO | 2008/107102 | A1 | 9/2008 | |
| WO | 2008/107103 | A1 | 9/2008 | |
| WO | WO 2008/107101 | | 9/2008 | |
| WO | WO 2008/107102 | | 9/2008 | |
| WO | WO 2008/107103 | | 9/2008 | |
| WO | 2010/021765 | A1 | 2/2010 | |
| WO | WO 2010/021765 | | 2/2010 | |

OTHER PUBLICATIONS

"Capture." Merriam-Webster.com Dictionary, Merriam-Webster, https://www.merriam-webster.com/dictionary/capture. Accessed May 10, 2024. (Year: 2024).*

ADA Accessibility Guidelines 1991 edition, as amended through Sep. 2002 ("ADA") (142 pages).

Exhibit 1A Claim Chart for U.S. Pat. No. 10,669,702 & U.S. Pat. No. 2,793,057 ("McGugin") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (208 pages).

Exhibit 1B Claim Chart for U.S. Pat. No. 10,724,217 & U.S. Pat. No. 2,793,057 ("McGugin") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (150 pages).

Exhibit 2A Claim Chart for U.S. Pat. No. 10,669,702 & U.S. Pat. No. 3,265,075 ("Edman") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (235 pages).

Exhibit 2B Claim Chart for U.S. Pat. No. 10,724,217 & U.S. Pat. No. 3,265,075 ("Edman") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (175 pages).

Exhibit 3A Claim Chart for U.S. Pat. No. 10,669,702 & U.S. Pat. No. 6,757,921 ("Esche") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (199 pages).

Exhibit 3B Claim Chart for U.S. Pat. No. 10,724,217 & U.S. Pat. No. 6,757,921 ("Esche") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (164 pages).

Exhibit 4A Claim Chart for U.S. Pat. No. 10,669,702 & U.S. Pat. No. 6,877,172 ("Malek I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (238 pages).

Exhibit 4B Claim Chart for U.S. Pat. No. 10,724,217 & U.S. Pat. No. 6,877,172 ("Malek I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (184 pages).

Exhibit 5A Claim Chart for U.S. Pat. No. 10,669,702 & U.S. Pat. No. 6,938,837 ("Nelson I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (223 pages).

Exhibit 5B Claim Chart for U.S. Pat. No. 10,724,217 & U.S. Pat. No. 6,938,837 ("Nelson I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (160 pages).

Exhibit 6A Claim Chart for U.S. Pat. No. 10,669,702 & U.S. Pat. No. 6,810,539 ("Bosio I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (171 pages).

Exhibit 6B Claim Chart for U.S. Pat. No. 10,724,217 & U.S. Pat. No. 6,810,539 ("Bosio I") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (127 pages).

Exhibit 7A Claim Chart for U.S. Pat. No. 10,669,702 & U.S. Pat. No. 7,104,473 ("Bosio II") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (164 pages).

Exhibit 7B Claim Chart for U.S. Pat. No. 10,724,217 & U.S. Pat. No. 7,104,473 ("Bosio II") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (131 pages).

Exhibit 8A Claim Chart for U.S. Pat. No. 10,669,702 & U.S. Patent Application Publication No. 2005/0189438 ("Bosio III") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (185 pages).

Exhibit 8B Claim Chart for U.S. Pat. No. 10,724,217 & U.S. Patent Application Publication No. 2005/0189438 ("Bosio III") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (140 pages).

Exhibit 9A Claim Chart for U.S. Pat. No. 10,669,702 & German Utility Model Application No. DE 202005013425U1 in the name of Weidmann Plastics Technology AG ("Weidmann") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (203 pages).

Exhibit 9B Claim Chart for U.S. Pat. No. 10,724,217 & German Utility Model Application No. De 202005013425U1 in the name of Weidmann Plastics Technology AG ("Weidmann") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (164 pages).

Exhibit 10A Claim Chart for U.S. Pat. No. 10,669,702 & Matsushita Electric Works Japanese Unexamined Patent Application Publication No. H10-152871 in the names of Nomura et al. ("Nomura") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (116 pages).

Exhibit 10B Claim Chart for U.S. Pat. No. 10,724,217 & Matsushita Electric Works Japanese Unexamined Patent Application Publication No. H10-152871 in the names of Nomura et al. ("Nomura") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (92 pages).

Exhibit 11A Claim Chart for U.S. Pat. No. 10,669,702 & Japanese Utility Model Registration No. U3078605 in the name of Sumitomo ("Sumitomo") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (184 pages).

Exhibit 11B Claim Chart for U.S. Pat. No. 10,724,217 & Japanese Utility Model Registration No. U3078605 in the name of Sumitomo ("Sumitomo") as referenced in Kohler Co.'s Invalidity Contentions in the case *Delta Faucet Company* v. *Kohler Co.* in the United States

(56) References Cited

OTHER PUBLICATIONS

District Court for the Eastern District of Wisconsin; Case No. 2:21-cv-00003-PP; May 6, 2021 (137 pages).
Exhibit 12A Claim Chart for U.S. Pat. No. 10,669,702 & Japanese Utility Model Application H04-50466 ("Ugi") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (218 pages).
Exhibit 12B Claim Chart for U.S. Pat. No. 10,724,217 & Japanese Utility Model Application H04-50466 ("Ugi") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (171 pages).
Exhibit 13A Claim Chart for U.S. Pat. No. 10,669,702 & Japanese Laid-open Disclosure Public Patent Bulletin 2003-268824 ("Motoyama") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (178 pages).
Exhibit 13B Claim Chart for U.S. Pat. No. 10,724,217 & Japanese Laid-open Disclosure Public Patent Bulletin 2003-268824 ("Motoyama") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (141 pages).
Exhibit 14A Claim Chart for U.S. Pat. No. 10,669,702 & International Patent Application Publication No. WO 2004/008581 in the name of McLeish ("McLeish") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (97 pages).
International Preliminary Report on Patentability for PCT/CH2006/000422, issued Feb. 2008 (7 pages).
Kohler Co.'s Invalidity Contentions in the case *Delta Faucet Company* v. *Kohler Co.* in the United States District Court for the Eastern District of Wisconsin. Case No. 2:21-cv-00003-PP; May 6, 2021 (30 pages).
Opening Expert Report of James J. Sposit Regarding Invalidity in the case *Delta Faucet Company* v. *Kohler Co.* in the United States District Court for the Eastern District of Wisconsin. Case No. 2:21-cv-00003-PP; Feb. 17, 2022 (482 pages).
Supplement to Kohler Co.'s Invalidity Contentions in the case *Delta Faucet Company* v. *Kohler Co.* in the United States District Court for the Eastern District of Wisconsin. Case No. 2:21-cv-00003-PP; Jul. 23, 2021 (12 pages).
Examination Report for European Application No. EP 06772392.4, dated Sep. 20, 2013, 6 pgs.
Grohe Product Catalog pages, "Stainless Steel Pull-Out Spray", 33 755, 2004, 4 pages.
International Preliminary Report on Patentability received for PCT Patent Application No. PCT/US14/17696, mailed on Sep. 3, 2015, 6 pages.
International Preliminary Report on Patentability received for PCT Patent Application No. PCT/US2006/022061, dated Mar. 31, 2009, 4 pages.
International Search Report and Written Opinion received for PCT Patent Application No. PCT/US2006/022061, mailed on Jan. 11, 2008, 4 pages.
Office Action in Ex Parte Reexamination of U.S. Pat. No. 10,240,326 (U.S. Appl. No. 90/014,400) dated Apr. 13, 2020, 11 pages.
Order Granting Request for Ex Parte Reexamination of U.S. Pat. No. 10,240,326 (U.S. Appl. No. 90/014,400) dated Dec. 13, 2019, 9 pages.
PCT International Search Report and Written Opinion for PCT/US2014/017696, 7 pages, dated Jun. 5, 2014.
Request for Ex Parte Reexamination of U.S. Pat. No. 10,240,326 (U.S. Appl. No. 90/014,400) dated Oct. 29, 2019, 108 pages.
Supplementary European Search Report for European Application No. EP 06772392.4, issued Sep. 6, 2010, 6 pgs.
Toto Ltd., English Machine Translation 2 of Description of JP 2003-268824A, published Sep. 25, 2003 (5 pages).
Toto Ltd., Espacenet English Machine Translation 1 of Description of JP 2003-268824A, published Sep. 25, 2003 (6 pages).
Exhibit 14B Claim Chart for U.S. Pat. No. 10,724,217 & International Patent Application Publication No. WO 2004/008581 in the name of McLeish ("McLeish") as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (78 pages).
Exhibit 15A Claim Chart for U.S. Pat. No. 10,669,702 & American Standard Dock-Tite™ Magnetic Docking System as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (4 pages).
Exhibit 15B Claim Chart for U.S. Pat. No. 10,724,217 & American Standard Dock-Tite™ Magnetic Docking System as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (4 pages).
Exhibit 16A Claim Chart for U.S. Pat. No. 10,669,702 & Globe Union Industrial Corp./Gerber Plumbing Fixtures LLC/Danze, Inc. DocKFORCE® Magnetic Docking Technology as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (4 pages).
Exhibit 16B Claim Chart for U.S. Pat. No. 10,724,217 & Globe Union Industrial Corp./Gerber Plumbing Fixtures LLC/Danze, Inc. DocKFORCE® Magnetic Docking Technology as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (4 pages).
Exhibit 17A Claim Chart for U.S. Pat. No. 10,669,702 & Kohler Docknetik® Magnetic Docking System. As referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (45 pages).
Exhibit 17B Claim Chart for U.S. Pat. No. 10,724,217 & Kohler Docknetik® Magnetic Docking System as referenced in Kohler Co.'s Invalidity Contentions in the case *Delta Faucet Company* v. *Kohler Co.* in the United States District Court for the Eastern District of Wisconsin; Case No. 2:21-cv-00003-PP; May 6, 2021 (35 pages).
Latoscana Elba Kitchen Faucet With Magnetic Spray, Model 78CR557PMEX, retrieved from www.thehomedepot.com prior to May 3, 2007, 2 pgs.
Latoscana Elba Kitchen Faucet With Magnetic Spray,Brushed Nickel Finish, Model 78PW557PMEX, retrieved from www.thehomedepot.com prior to May 3, 2007, 2 pgs.
Latoscana Elba Kitchen Faucet With Magnetic Spray, Model 78CR557M, Design Specifications, retrieved from www.latoscanacollection.com prior to May 3, 2007, 3 pgs.
Grohe Product Catalog pp., Stainless Steel pull-out spray, 33 755, 2004, 4 pgs.
Supplementary European Search Report for European Application No. Ep 06772392.4, dated Sep. 6, 2010, 14 pgs. (including PCT International Search Report and Written Opinion for International Application No. PCT/US2006/22061, dated Jan. 2, 2008).

* cited by examiner

MAGNETIC COUPLING FOR SPRAYHEADS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is *a broadening reissue of U.S. Pat. No. 10,072,410, issued Jul. 8, 2016, which is* a continuation of [co-pending] U.S. patent application Ser. No. 13/951,310, filed Jul. 25, 2013, *now U.S. Pat. No. 9,404,242,* which is a continuation of U.S. patent application Ser. No. 12/650,330, filed Dec. 30, 2009, now U.S. Pat. No. 8,496,028, which is a divisional of U.S. patent application Ser. No. 12/059,403, filed Mar. 31, 2008, now U.S. Pat. No. 7,753,079, which is a continuation-in-part of U.S. patent application Ser. No. 11/393,450, filed Mar. 30, 2006, now U.S. Pat. No. 7,909,061, which claims the benefit of U.S. Provisional Application No. 60/691,389, filed Jun. 17, 2005, the disclosures of which are expressly incorporated by reference herein.

BACKGROUND AND SUMMARY OF THE INVENTION

The present invention relates to faucets having pullout sprayheads and, more particularly, to improvements in the manner by which the sprayhead is coupled and/or uncoupled from the faucet body.

Faucets having sprayheads that pull out from the faucet body enable users to manipulate the sprayhead independent of the faucet body and to aim the water spray directly at a target instead of requiring the user to place the target under the sprayhead. Such prior art faucets typically utilize locking bayonet connectors, or connectors comprising collars and snap fingers to produce a retaining force to couple the sprayhead to the faucet body.

One embodiment of the present invention generally provides a liquid dispensing assembly comprising a supply hose adapted to supply a liquid, a dispensing member fluidly coupled to the supply hose and adapted to dispense the liquid, a support member adapted to support the dispensing member, and a magnetic coupling to removably couple the dispensing member to the support member. The magnetic coupling includes a magnetic member supported by one of the support member and the dispensing member. The magnetic member is dipolar and has a magnetic field of between 400 and 2,000 gauss tested at 0.090 inches. The attracted member is magnetically attracted to the magnetic member and supported by the other of the dispensing member and the support member. The magnetic coupling requires between 2.0 and 12.0 pounds of force to pull the dispensing member from the support member.

Another embodiment of the present invention generally provides a method of dispensing liquid. The method comprises the steps of fluidly coupling a dispensing member to a source of liquid through a supply line, supporting the dispensing member with a support member, magnetically holding the dispensing member in a coupled position with the support member, applying force to separate the dispensing member from the support member, and placing the dispensing member proximally to the support member to removably and magnetically couple the dispensing member to the support member. The dispensing member comprises one of a magnetic member and an attracted member, the magnetic member being dipolar and having a magnetic field of between 400 and 2,000 gauss tested at 0.090 inches. The supply line is adapted to extend from the support member when the dispensing member is separated from the support member, the support member comprising the other of the magnetic member and the attracted member.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

The detailed description of the drawings particularly refers to the accompanying figures in which.

Figure 1:
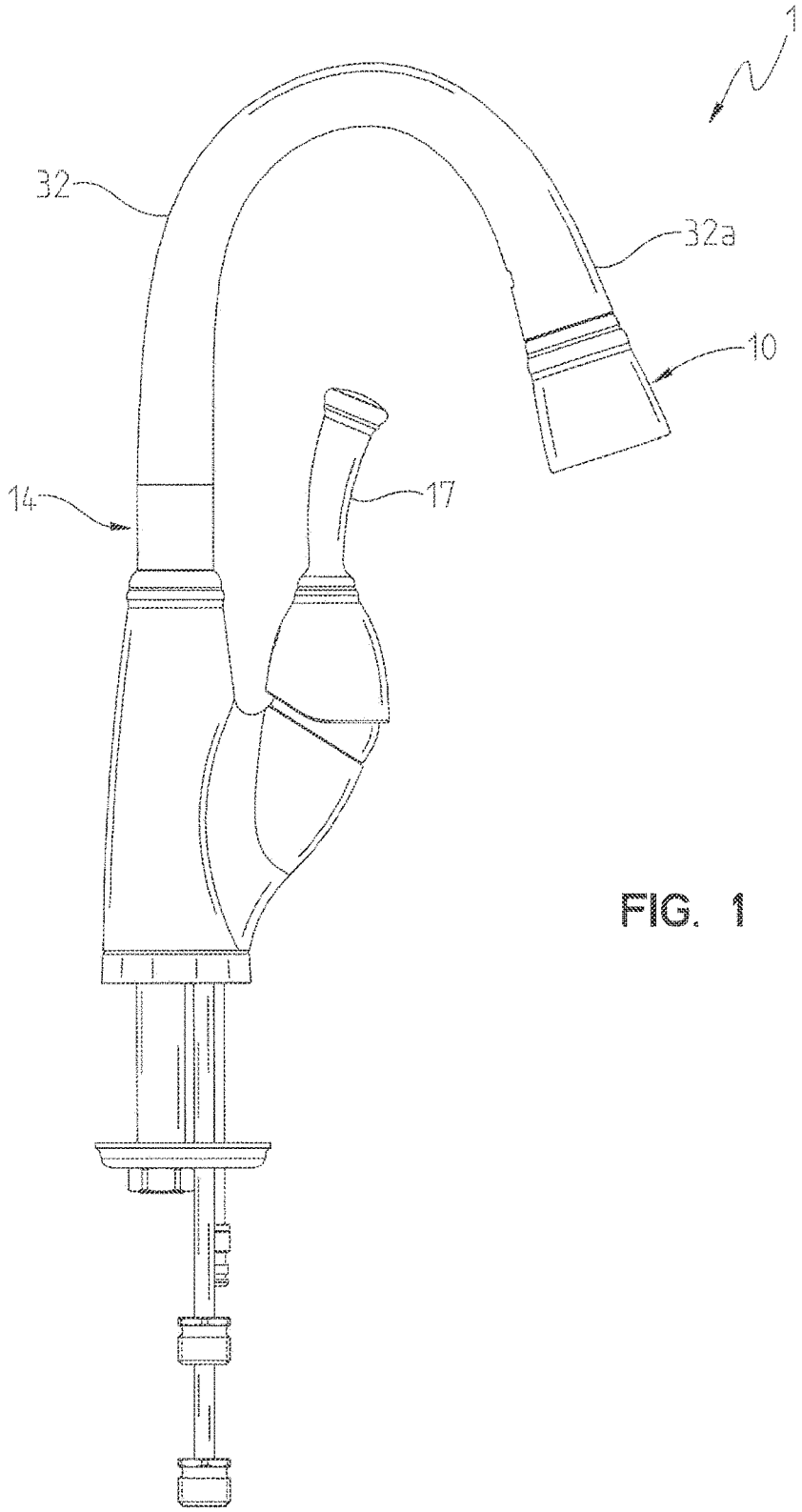
FIG. 1 is a side view of a faucet in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE DRAWINGS

The embodiments hereinafter disclosed are not intended to be exhaustive or limit the invention to the precise forms disclosed in the following description. Rather the embodiments are chosen and described so that others skilled in the art may utilize its teachings.

Figure 2:
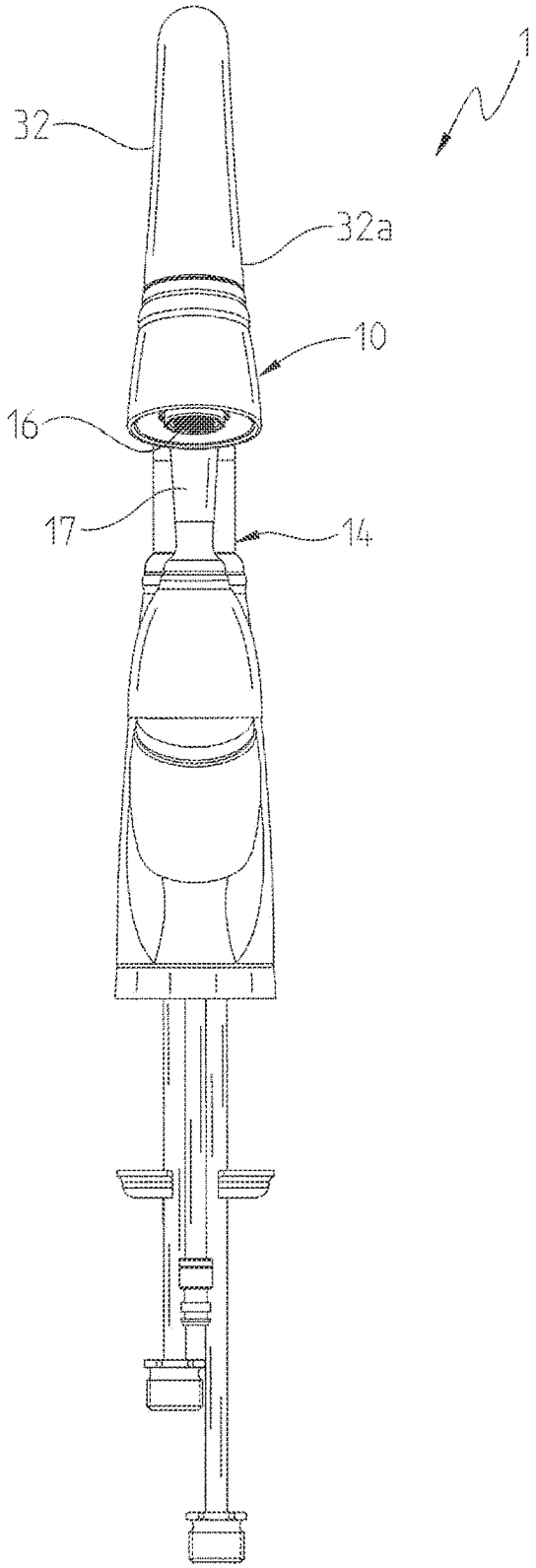
FIG. 2 is a front view of the faucet of FIG. 1.

Referring first to FIGS. 1 and 2, faucet 1 according to one embodiment of the present invention is illustrated. Faucet 1 generally includes sprayhead 10 and *a support body, such as* faucet body 14. Faucet 1 is of the type wherein sprayhead 10 may be pulled out and manipulated independent of body 14. More particularly, faucet body 14 includes neck or delivery spout 32 having dispensing end 32a to which sprayhead 10 is releasably coupled, as is described in further detail below.

Figure 3:
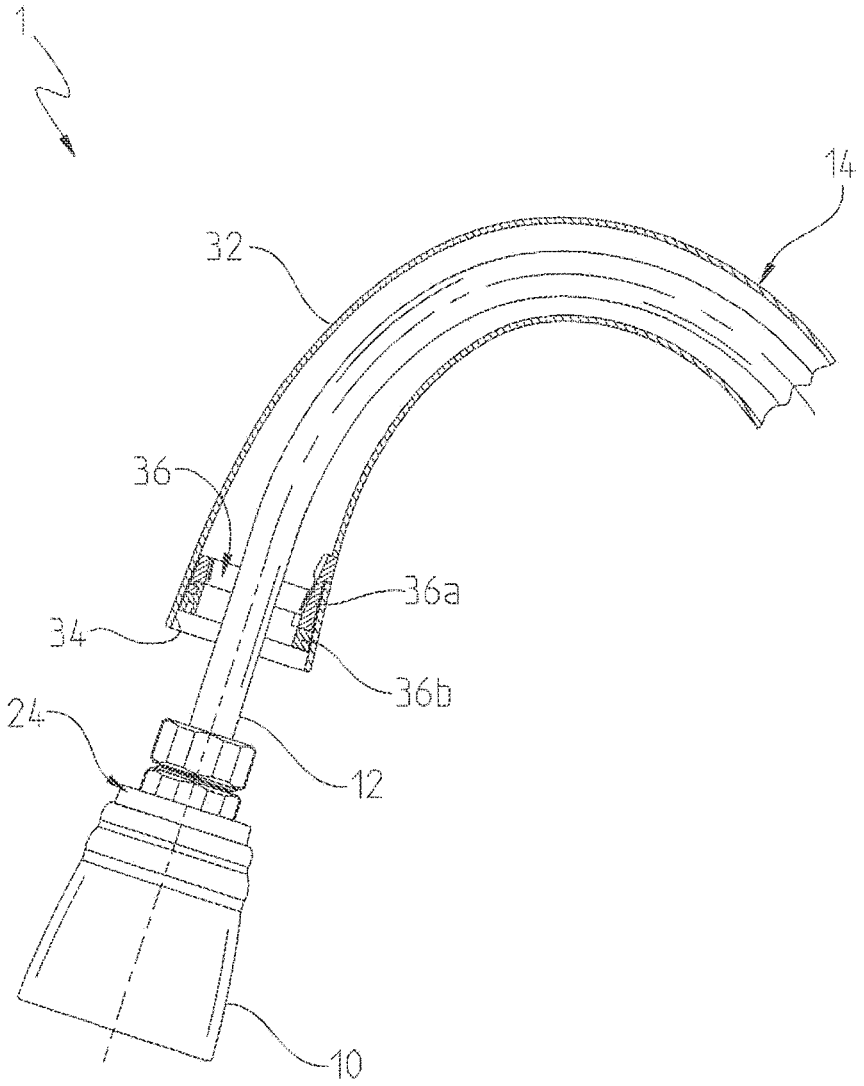
FIG. 3 is a partial cross-sectional view of a portion of the faucet of FIG. 1.
Figure 4:
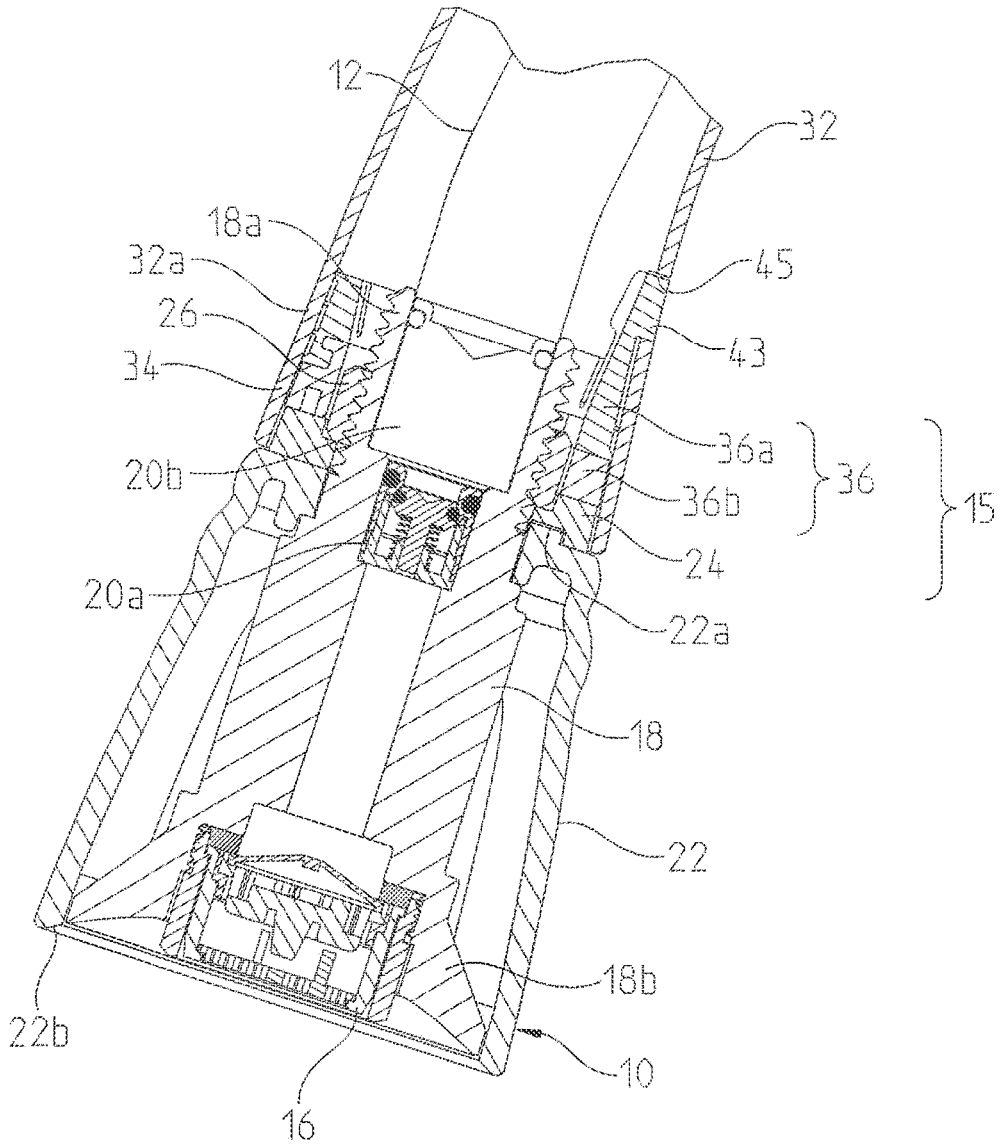
FIG. 4 is a detailed cross-sectional view of a portion of the faucet of FIG. 1.
Figure 5:
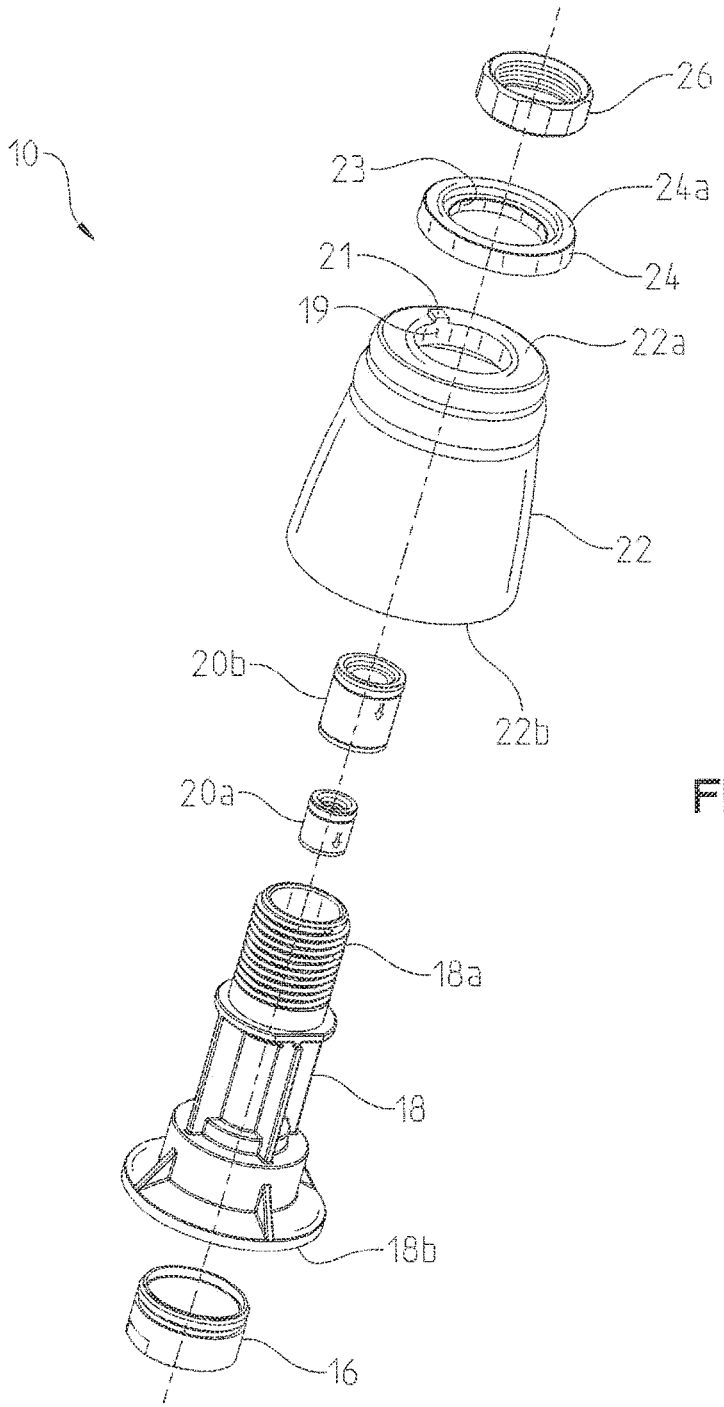
FIG. 5 is an exploded perspective view of the faucet of FIG. 4.

Referring now to FIGS. 3-5, faucet 1 also includes flexible water supply line or spout tube 12, which extends through neck 32 and is fluidly coupled at a first end to a water supply source, illustratively through a valve (not shown) operably coupled to *a user input, such as* a handle 17 (FIG. 1). A second end of the water supply line 12 is fluidly coupled to sprayhead 10. The faucet 1 may include additional features detailed in U.S. patent application Ser. No. 11/325,128, filed Jan. 4, 2006, the disclosure of which is expressly incorporated by reference herein.

Sprayhead 10 is coupled to neck 32 of faucet body 14 by magnetic coupling 15. Magnetic coupling 15 generally includes head connector 24 coupled to sprayhead 10 and body connector 36 coupled to neck 32 of faucet body 14. As described in further detail below, head connector 24 and body connector 36 are adapted to releasably engage with one another to thereby releasably couple sprayhead 10 to neck 32 of faucet body 14.

Turning now to FIGS. 4 and 5, sprayhead 10 includes aerator 16, waterway member 18, check valves 20a and 20b, shell 22, head connector 24 and retaining nut 26. Aerator 16 is received in and coupled to dispensing end 18b of waterway member 18. Check valves 20a, 20b are received in and coupled to threaded receiving end 18a of waterway member 18. The assembly of aerator 16, waterway member 18 and check valves 20a, 20b are disposed within shell 22. Shell 22 includes receiving end 22a and opposing dispensing end 22b. Tab 21 protrudes from receiving end 22a and, as discussed in further detail below, serves to align head connector 24 on receiving end 22a of shell 22. When the assembly of aerator 16, waterway member 18 and check valves 20a, 20b is disposed in shell 22, threaded receiving end 18a extends through opening 19 in receiving end 22a of shell 22. Threaded receiving end 18a of waterway member 18 also extends through opening 23 of head connector 24 and receives retaining nut 26, which secures head connector 24 to shell 22. Threaded receiving end 18a of waterway member 18 then extends from nut 26 and is fluidly coupled with water supply line 12.

Turning to FIGS. 5 and 7A-7E, head connector 24 is substantially ring-shaped and includes top surface 24a, opposing bottom surface 24b and opening 23 extending therethrough from top surface 24a to bottom surface 24b. Opening 23 is sized to receive threaded receiving end 18a of waterway member 18 therethrough. Notch 25 is cut into bottom surface 24b and is configured to receive tab 21 of shell 22 to facilitate proper angular orientation therebetween.

Referring now to FIGS. 4 and 6A-6E, body connector 36 is disposed within dispensing end 32a of neck 32. A portion of neck 32 extends past body connector 36 to form collar 34, which is configured to removably and concentrically receive therein head connector 24 and receiving end 18a of waterway 18. Body connector 36 includes opening 38, which extends through body connector 36 and is configured to receive receiving end 18a of waterway member 18 therethrough. Body connector 36 includes base 36a and connecting element 36b. Base 36a illustratively serves to couple body connector 36 to faucet body 14, while connecting element 36b interacts with head connector 24 to releasably couple sprayhead 10 to faucet body 14, as is described in further detail below.

Base 36a includes resilient clip or snap finger 43 extending upwardly and outwardly therefrom. Slot 45 extends through neck 32 of faucet body 14 and is configured to receive clip 43. Clip 43 is snap-received within slot 45 to secure body connector 36 in neck 32 of faucet body 14. Recess 39 extends into and about a portion of the inner periphery of base 36a. Lip 41 extends from and about a portion of the outer periphery of connecting element 36b. Lip 41 is configured to engage with recess 39 to thereby couple connecting element 36b to base 36a. Base 36a may be formed of any suitable material.

Body connector 36 need not include two separate components. Rather base 36a and connecting element 36b may be integrally formed as a single unit, such that body connector 36 is one piece. In one embodiment, base 36a is formed of polymers and is at least partly overmolded to connecting element 36b. In another embodiment, base 36a is fully overmolded to connecting element 36b and encapsulates connecting element 36b. Overmolding is configured to protect the connecting elements from corrosion due to contact with fluids including water. Alternatively, corrosion may be prevented by coating or plating connecting elements. However, coatings and plating materials may be brittle and may crack due to the compressive forces that impinge on connecting elements when they are pressed into the faucet head or body. Cracking tendencies are exacerbated by large fluid temperature differences which may range from about 32° F. to about 212° F. in various faucet applications. In one embodiment, base 36a is formed of glass-filled polypropylene. Glass-filled polypropylene flows well in an injection-molding die and has good rigidity characteristics so that thin overmolding layers may be produced. In another embodiment, base 36a is formed of acetal. Acetal has good hysteresis characteristics and resists flexing fatigue.

Overmolding might create a larger gap between the connecting elements than that created by coating or plating. Gaps reduce the magnetic attractive force between connecting elements in proportion to the gap distance. The magnetic flux density of a magnetic connecting element, which corresponds to the attractive force, may be increased by increasing its surface area, thickness, or magnetic material to compensate for the increased gap. These options are generally accompanied by increases in cost. Also, an application may be size-constrained for practical or aesthetic reasons. In the case of a kitchen, bath or roman-tub faucet, products must be aesthetically pleasing and must fit within standardized openings provided in sinks, tubs and other faucet support devices.

Magnets have magnetic fields characterized by their strength and orientation. Magnetic poles are limited regions in the magnet at which the field of the magnet is most intense, each of which is designated by the approximate geographic direction to which it is attracted, north (N) or south (S). The direction of the magnetic field is the direction of a line that passes through the north and south poles of the magnet. Generally, the direction is perpendicular to the magnetic surface of the magnet. The orientation of the field may be characterized as the direction pointed to by the north pole of the magnet.

Magnets may be characterized in several different ways. For instance, the magnet type may be a permanent magnet or an electromagnet. A permanent magnet exhibits a permanent (i.e. constant) magnetic field. An electromagnet generates a magnetic field only when a flow of electric current is passed through it. The magnetic field generated by the electromagnet disappears when the current ceases.

Magnets with a single magnetic field are considered dipolar because they have two poles, a north and a south pole. The magnetic field of a dipolar magnet may interact with the magnetic field of other magnets to produce a repelling or an attracting force. The magnetic field may also interact with certain attractable materials, such as iron or steel, that are naturally attracted to magnets.

The strength of the attracting or repelling magnetic force is determined by the strength of the magnetic field of the magnet and by the degree of interaction between the magnetic field and a component that enters the field. The strength of a magnetic field is determined by the construction of the magnet. The strength of an electromagnetic field can be changed by changing the current that flows through the electromagnet. The degree of interaction is determined by the size of the magnetic surface that interacts with the component entering the field and by the distance between the magnet and the component entering the field. The magnetic force of a magnet, therefore, may be changed by changing the position of the magnet relative to another magnet or to the attractable material.

Figure 11A:
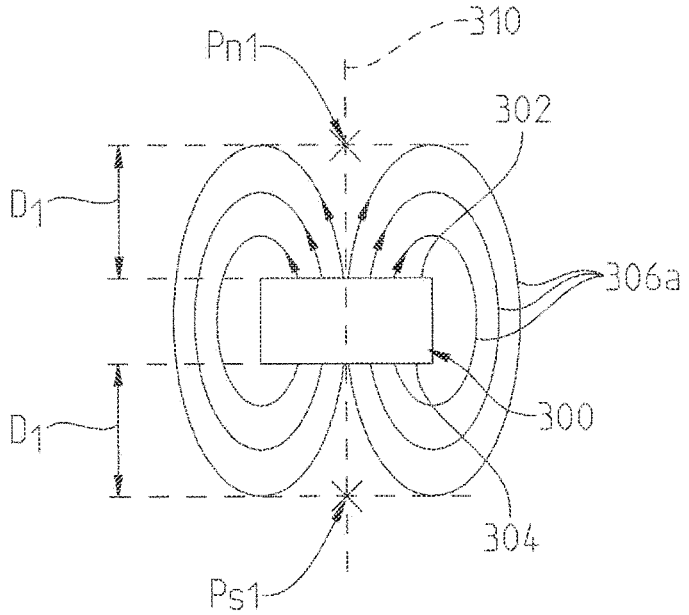
FIG. 11A is a conceptual diagram of the flux lines of a magnetic field of a rectangular magnet.
Figure 11B:
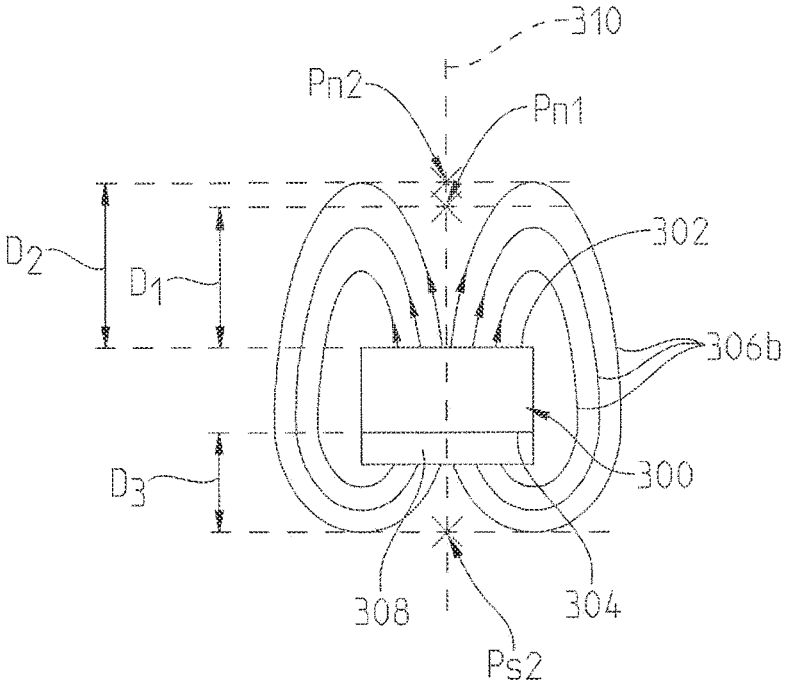
FIG. 11B is a conceptual diagram of the flux lines of a magnetic field of a rectangular magnet coupled to a backing element.

A backing element may increase the attractive force of a magnetic coupling. Referring now to FIGS. 11A and 11B, the magnetic flux densities of two magnetic fields are conceptually represented by magnetic flux lines 306a and 306b. FIG. 11A shows magnet 300 having magnetic flux lines 306a that extend from both surfaces 302, 304 connecting its north and south poles. Spaced-apart surfaces 302, 304 define the thickness of magnet 300. At points $P_{N1}$ and $P_{S1}$ located at a distance $D_1$ perpendicularly away from surfaces 302 and 304, respectively, on centerline 310, the magnetic field equals F gauss.

FIG. 11B shows magnet 300 coupled to backing element 308, and having flux lines 306b that extend from surface 302 to and through backing element 308 to surface 304 connecting its north and south poles. At points PN2 and PS2 located at corresponding distances D2 and D3 perpendicularly away from surfaces 302 and 304, respectively, on centerline 310, the magnetic field also has a value equal to F gauss. D2 is greater than both D1 and D3 meaning that the magnetic field strength changed as a result of the addition of backing element 308 and that backing element 308 increased the strength of the magnetic field at point PN1 a distance D1 perpendicularly away from surface 302. A suitable backing element may be a plate comprising steel, iron, and other non-magnetic magnetically attractive materials. Depending on the selection of materials and particular designs, the magnetic flux density at a distance away from the surface of magnet 300 may be increased more by the addition of backing element 308 than by an increase in the thickness of magnet 300 equal to the thickness of backing element 308. Thus, a stronger attractive force may be achieved with a smaller, less costly, corrosion resistant connector.

Figure 12A:
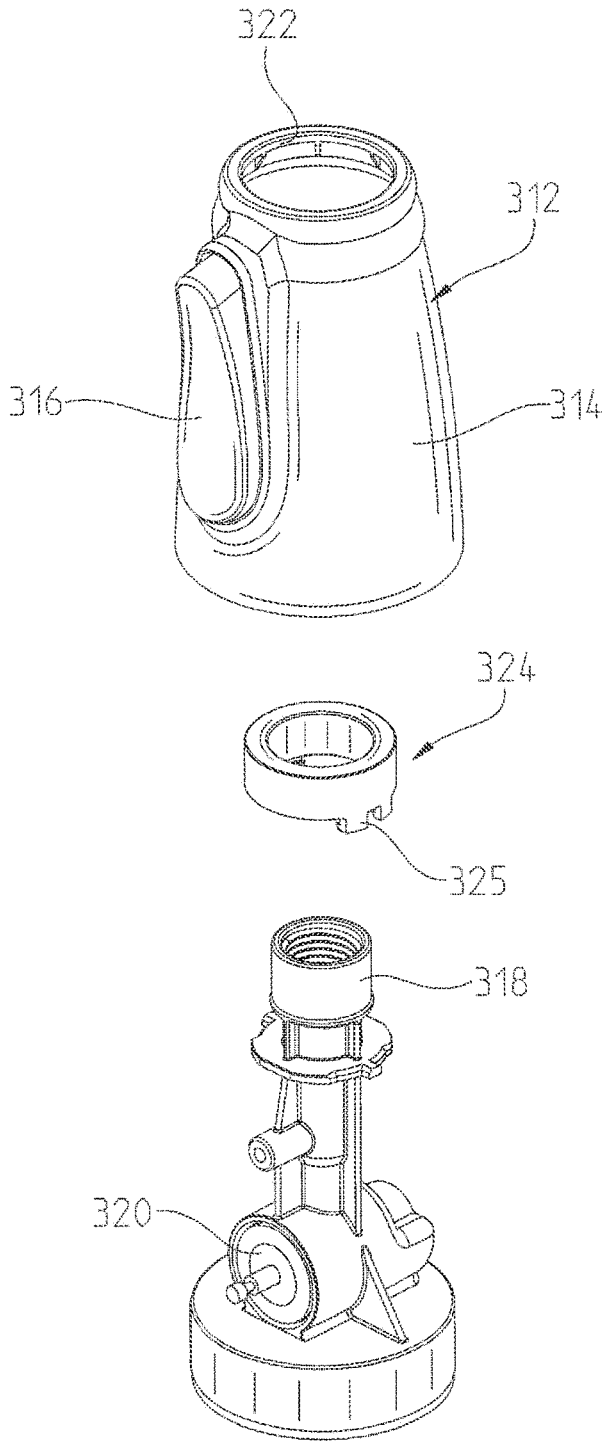
FIG. 12A is an exploded perspective view of a faucet head including a magnetic connector having a backing element.
Figure 12B:
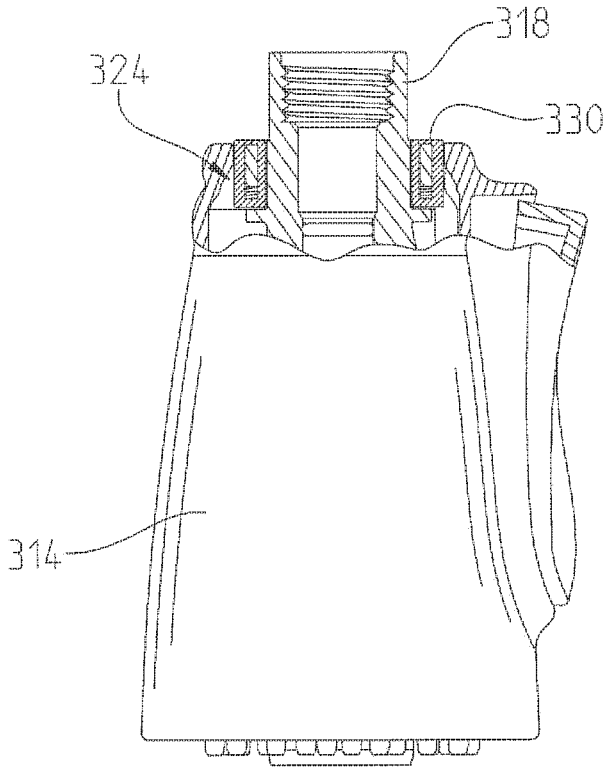
FIG. 12B is a side view of the faucet of FIG. 12A showing a partial detailed cross-section of the magnetic connector positioned in the faucet head.
Figure 13A:
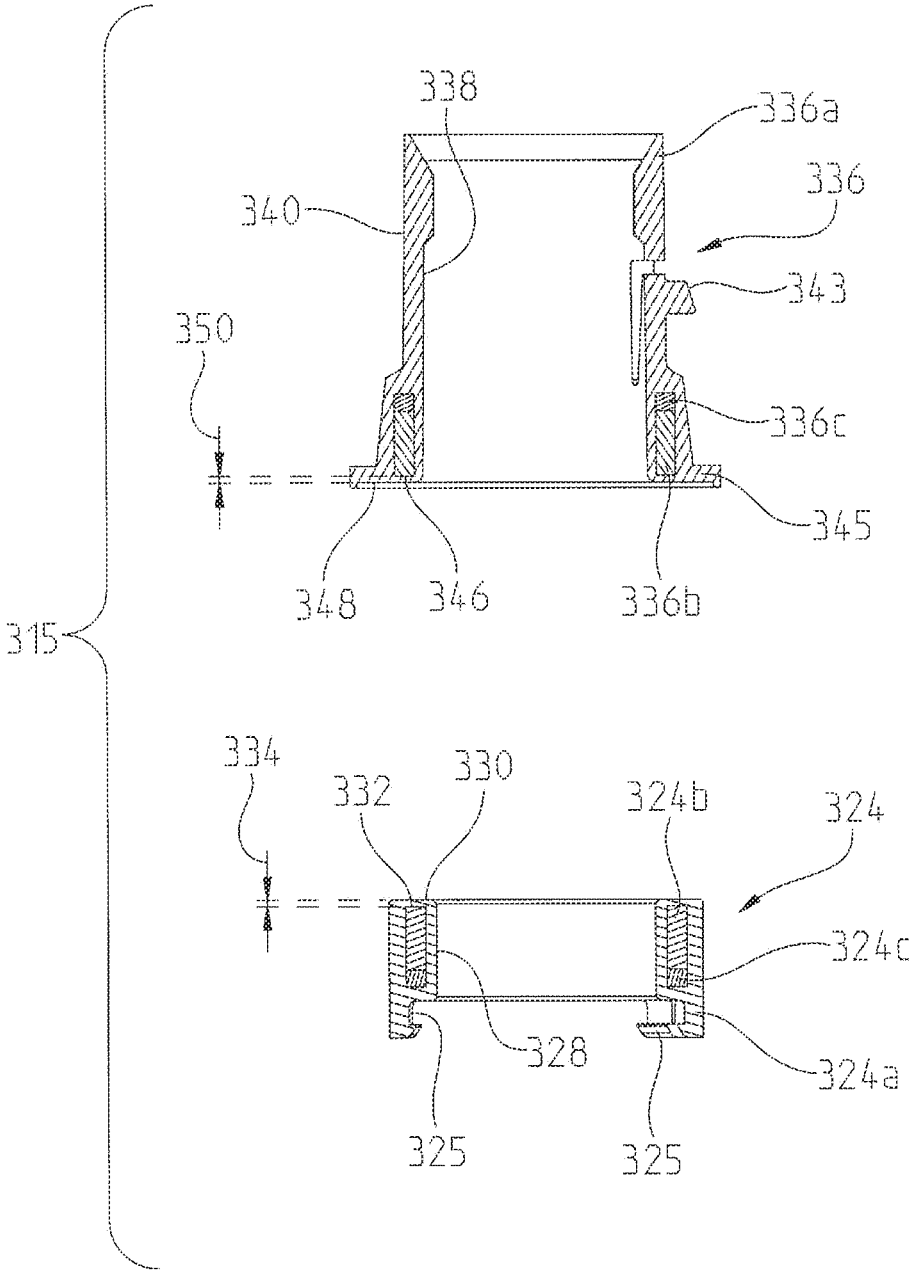
FIG. 13A is a cross-sectional side view of an alternative magnetic coupling showing magnetic connectors including connecting elements and backing elements.
Figure 13B:
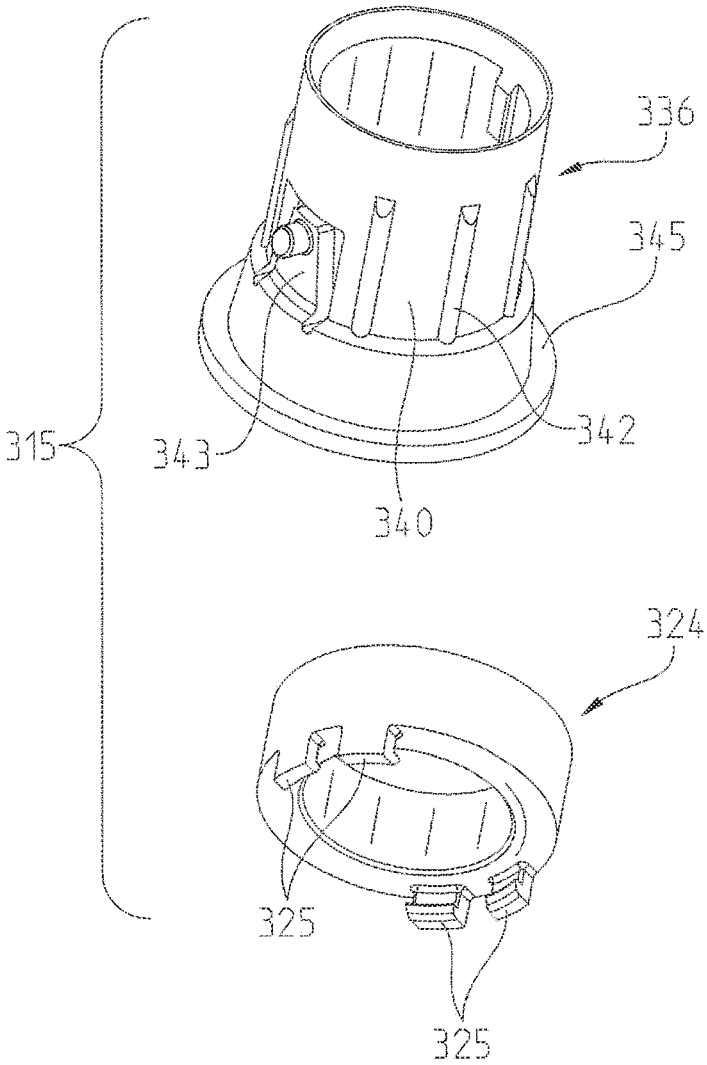
FIG. 13B is a perspective view of the alternative magnetic coupling of FIG. 13A.

Exemplary embodiments of connectors having overmolded connecting elements and backing elements are shown in FIGS. 12A, 12B, 13A, 13B and 13C. Referring now to FIGS. 12A and 12B, an alternative faucet head 312 comprises a body 314 having an opening 322, a head connector 324 and a dispensing portion 318. Head connector 324 is explained in detail with reference to FIGS. 13A and 13B. Body 314 includes lever 316 adapted to activate waterflow valve 320 to dispense water. Head connector 324 couples to water dispensing portion 318 by means of clips 325. FIG. 13B is a partial cross-sectional view of body 314 showing head connector 324 positioned on dispensing portion 318 and having surface 330 protruding through opening 322.

FIGS. 13A and 13B show magnetic coupling 315 comprising a pair of connectors. While either connector may be positioned in a body or head of a faucet, connector 336 will be described as a body connector and connector 324 will be described as a head connector for ease of explanation.

Body connector 336 includes opening 338 extending through it and being configured to receive a water supply line therethrough. Body connector 336 includes base 336a, connecting element 336b, and backing element 336c. Body connector base 336a is overmolded to encapsulate connecting element 336b and backing element 336c. Body connector base 336a further includes clip or snap finger 343. Body connector base 336a has an external profile 340 having ribs 342 designed to fit tightly inside the neck of a faucet. Optionally, body connector base 336a has an outwardly protruding lip 345 designed to fit against the edge of the receiving end of the neck of a faucet without a collar. Body connector base 336a encapsulates connecting element 336b with material disposed over a surface 346, the encapsulating layer having a spaced-apart external surface 348 defining a layer thickness 350.

Figure 13C:
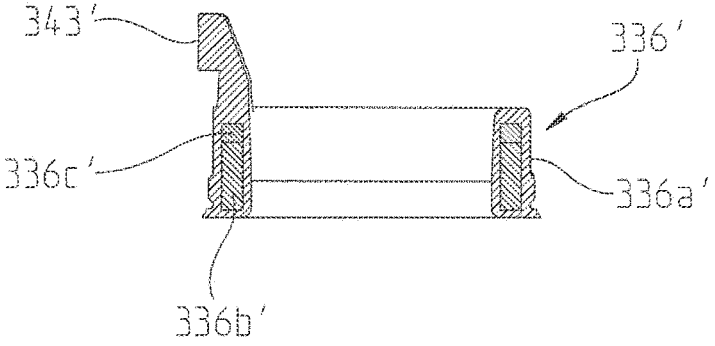
FIG. 13C is a cross-sectional side view of an alternative magnetic connector.
Figure 13D:
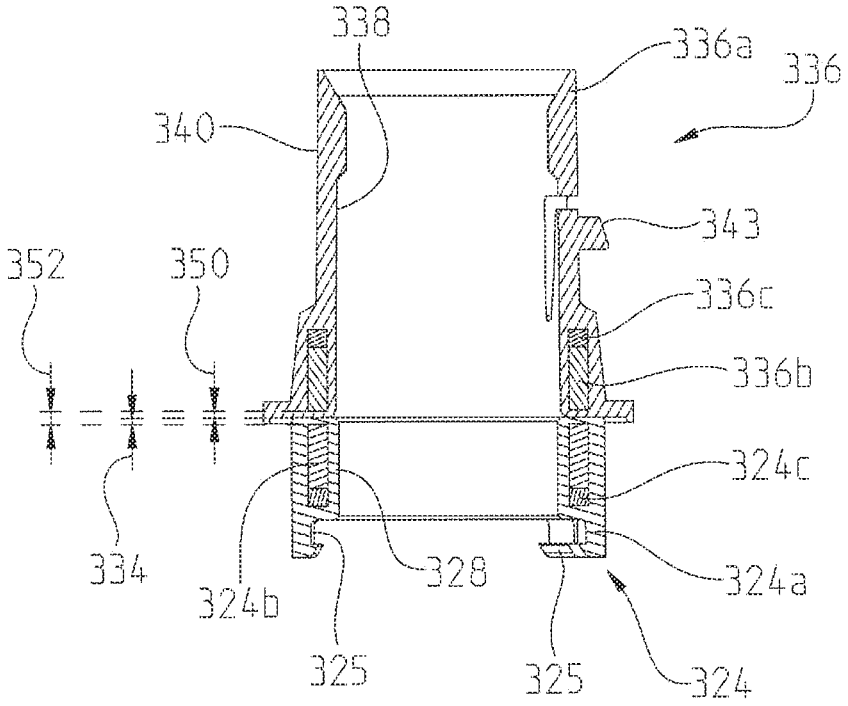
FIG. 13D is a cross-sectional side view of the magnetic coupling of FIG. 13A.

In another embodiment, body connector 336 does not have a lip and fits inside neck 32 as a suitable replacement for body connector 36. An embodiment of connector 336 without lip 345 is shown in FIG. 13C and denoted as connector 336'. Connector 336' includes base 336a', connecting element 336b', and backing element 336c'. Body connector base 336a' is overmolded to encapsulate connecting element 336b' and backing element 336c'. Body connector base 336a' further includes clip or snap finger 343'.

FIGS. 13A and 13B also show head connector 324. Head connector 324 includes opening 328 extending through it and being configured to receive water dispensing portion 318 therethrough. Head connector 324 includes base 324a, connecting element 324b, and backing element 324c. Head connector base 324a is overmolded to encapsulate connecting element 324b and backing element 324c. Head connector base 324a further includes clips 325 for securing head connector 324 to water dispensing portion 318. Head connector base 324a encapsulates connecting element 324b with material disposed over a surface 332, the encapsulating layer having a spaced-apart external surface 330 defining a layer thickness 334.

Backing elements 336c and 324c focus the magnetic fields to increase the attractive force and compensate for the loss of force created by gap 352. In one embodiment, a pulling force of between 2 and 12 pounds is required to pull apart head connector 324 from body connector 336. In a further illustrative embodiment, the pulling force required to separate head connector 324 from body connector 336 is between 3 and 8 pounds. In yet another illustrative embodiment, the pulling force is between 3.5 and 6 pounds. In one embodiment, each of connectors 336 and 324 have a coupling surface area between 0.4 and 2.0 square inches. In another embodiment, each of connectors 336 and 324 have a coupling surface area between 0.5 and 1.0 square inches. In one embodiment, each of connectors 336 and 324 have a magnetic field of between 400 and 2000 gauss tested at 0.090 inches. In another embodiment, each of connectors 336 and 324 have a magnetic field of between 500 and 1000 gauss tested at 0.090 inches. In one embodiment, the gap is in a range between 0.00 and 0.01 inches. In another embodiment, the gap is in a range between 0.040 and 0.080 inches. In one embodiment, the magnetic couplings satisfy the 24 hour CASS salt sprayer test according to ASTM-368. Each of connectors 324, 336 may be dipolar or multipolar.

[Backing elements 336c and 324c focus the magnetic fields to increase the attractive force and compensate for the loss of force created by gap 352. In one embodiment, a pulling force of between 2 and 12 pounds is required to pull apart head connector 324 from body connector 336. In a further illustrative embodiment, the pulling force required to separate head connector 324 from body connector 336 is between 3 and 8 pounds. In yet another illustrative embodiment, the pulling force is between 3.5 and 6 pounds. In one embodiment, each of connectors 336 and 324 have a coupling surface area between 0.4 and 2.0 square inches. In another embodiment, each of connectors 336 and 324 have a coupling surface area between 0.5 and 1.0 square inches. In one embodiment, each of connectors 336 and 324 have a magnetic field of between 400 and 2000 gauss tested at 0.090 inches. In another embodiment, each of connectors 336 and 324 have a magnetic field of between 500 and 1000 gauss tested at 0.090 inches. In one embodiment, the gap is in a range between 0.00 and 0.10 inches. In another embodiment, the gap is in a range between 0.040 and 0.080 inches. In one embodiment, the magnetic couplings satisfy the 24 hour CASS salt sprayer test according to ASTM-368. Each of connectors 324, 336 may be dipolar or multipolar.]

Figure 6A:
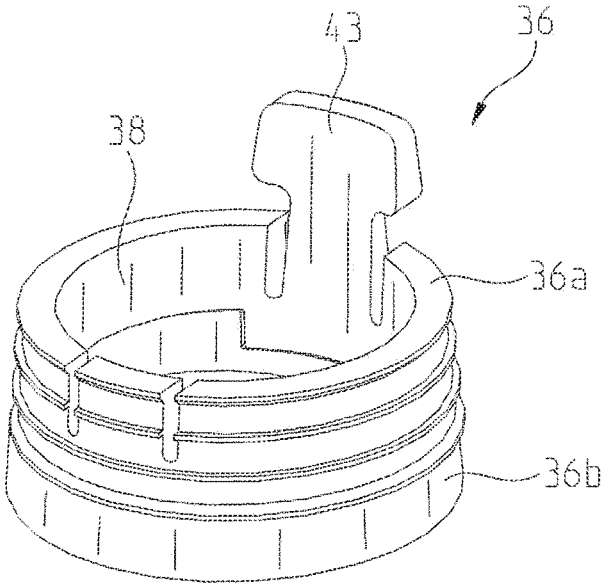
FIG. 6A is a perspective view of the body connector of the faucet of FIG. 4.
Figure 6E:
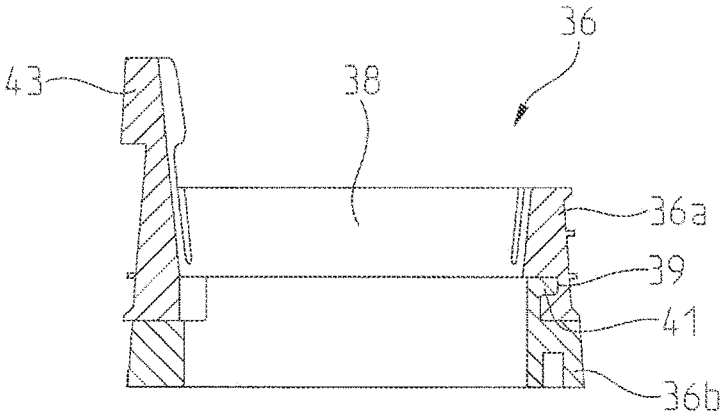
FIG. 6E is a cross-sectional view of the body connector of FIG. 6C taken along line 6E-6E.
Figure 6C:
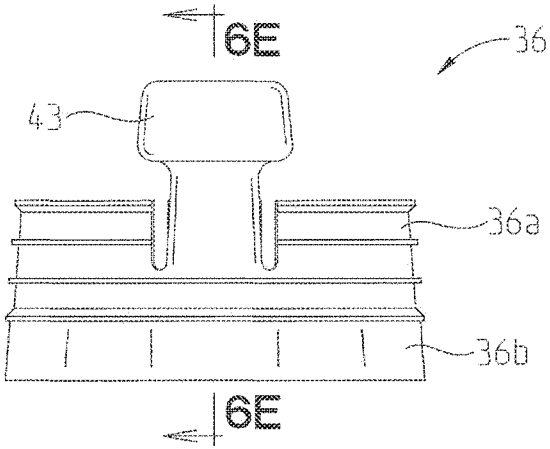
FIG. 6C is another side view of the body connector of FIG. 6A.
Figure 6B:
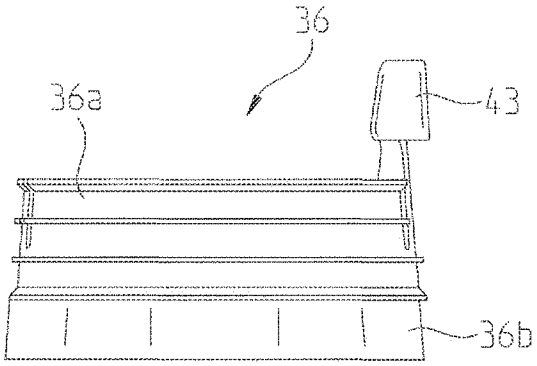
FIG. 6B is a side view of the body connector of FIG. 6A.
Figure 6D:
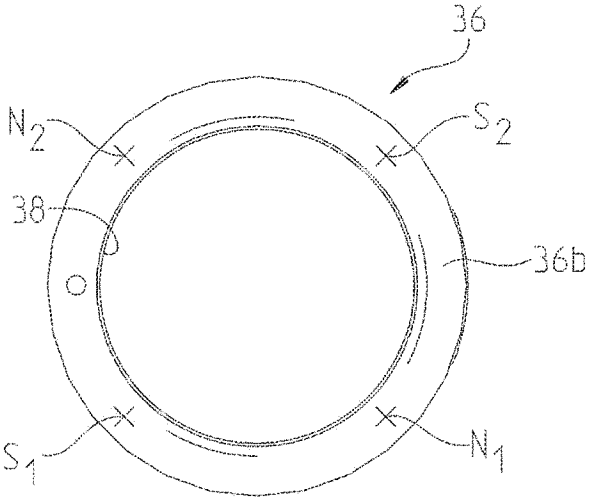
FIG. 6D is a bottom view of the body connector of FIG. 6A.
Figure 7A:
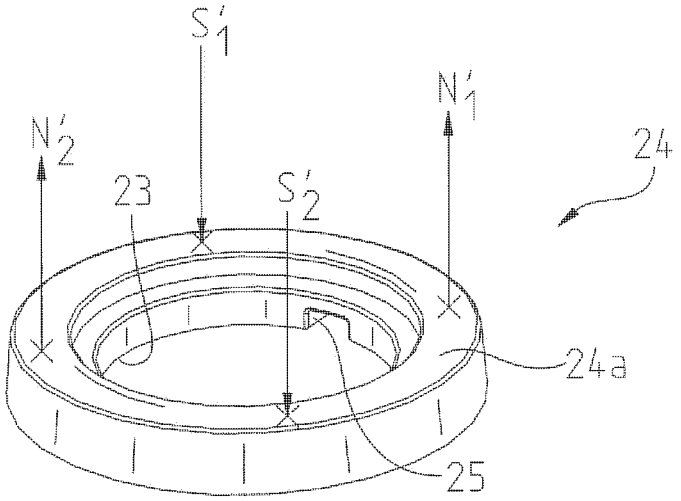
FIG. 7A is a perspective view of the head connector of the faucet of FIG. 4.
Figure 7E:
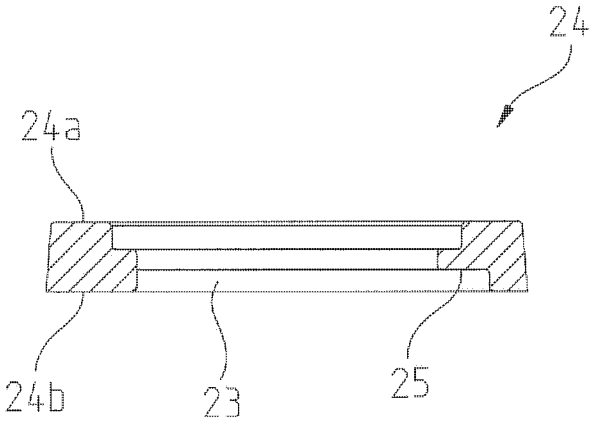
FIG. 7E is a cross-sectional view of the head connector of FIG. 7C taken along line 7E-7E.
Figure 7B:
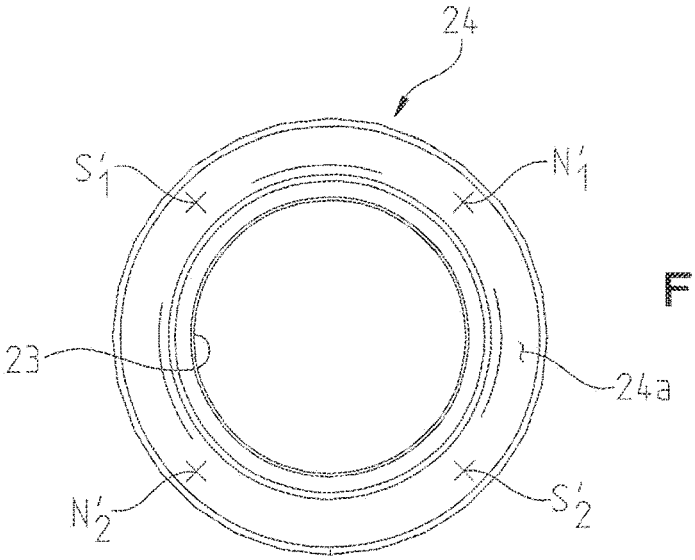
FIG. 7B is a top view of the head connector of FIG. 7A.
Figure 7C:
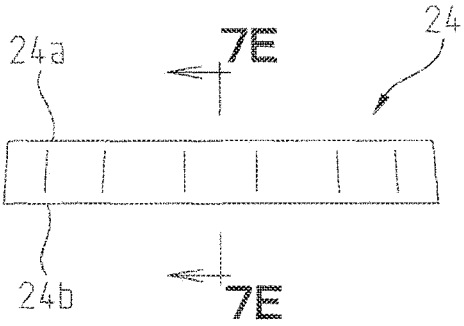
FIG. 7C is a side view of the head connector of FIG. 7A.
Figure 7D:
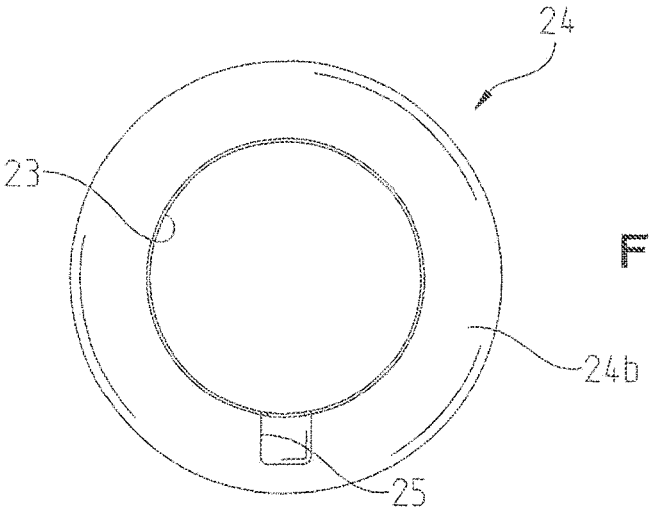
FIG. 7D is a bottom view of the head connector of FIG. 7A.

Referring again to FIGS. 3, 4, 6D, 7A, 7B, 8A, and 8B, the interaction between connecting element 36b of body connector 36 with head connector 24 to releasably couple sprayhead 10 to faucet body 14 will now be described. As shown in FIGS. 6D, 7A, and 7B and diagrammatically in FIGS. 8A and 8B, head connector 24 and connecting element 36b of body connector 36 may be in the form of magnets adapted to attract one another.

Unlike-poles attract and like-poles repel. Accordingly, when two dipolar magnets come into close proximity and their magnetic fields are oriented in the same direction, they attract one another. The north pole on the proximal surface of one magnet attracts the south pole on the proximal surface of the other magnet. On the other hand, when two dipolar magnets come into close proximity and their magnetic fields are oriented in opposite directions, they repel one another. For example, the north pole on the proximal surface of one magnet repels the north pole on the proximal surface of the other magnet.

Magnets may also include multiple magnetic fields with some fields oriented in a first direction and other fields oriented in a second direction that is opposite the first direction. When two multi-field magnets come in close proximity to one another, they will repel one another if the multiple fields are not oriented in the same direction and will attract one another if they are oriented in the same direction. Multi-field magnets provide two modes of operation: an attracting mode and a repelling mode. Couplings including multi-field magnets may be referred to as bi-modal couplings.

Figure 8A:
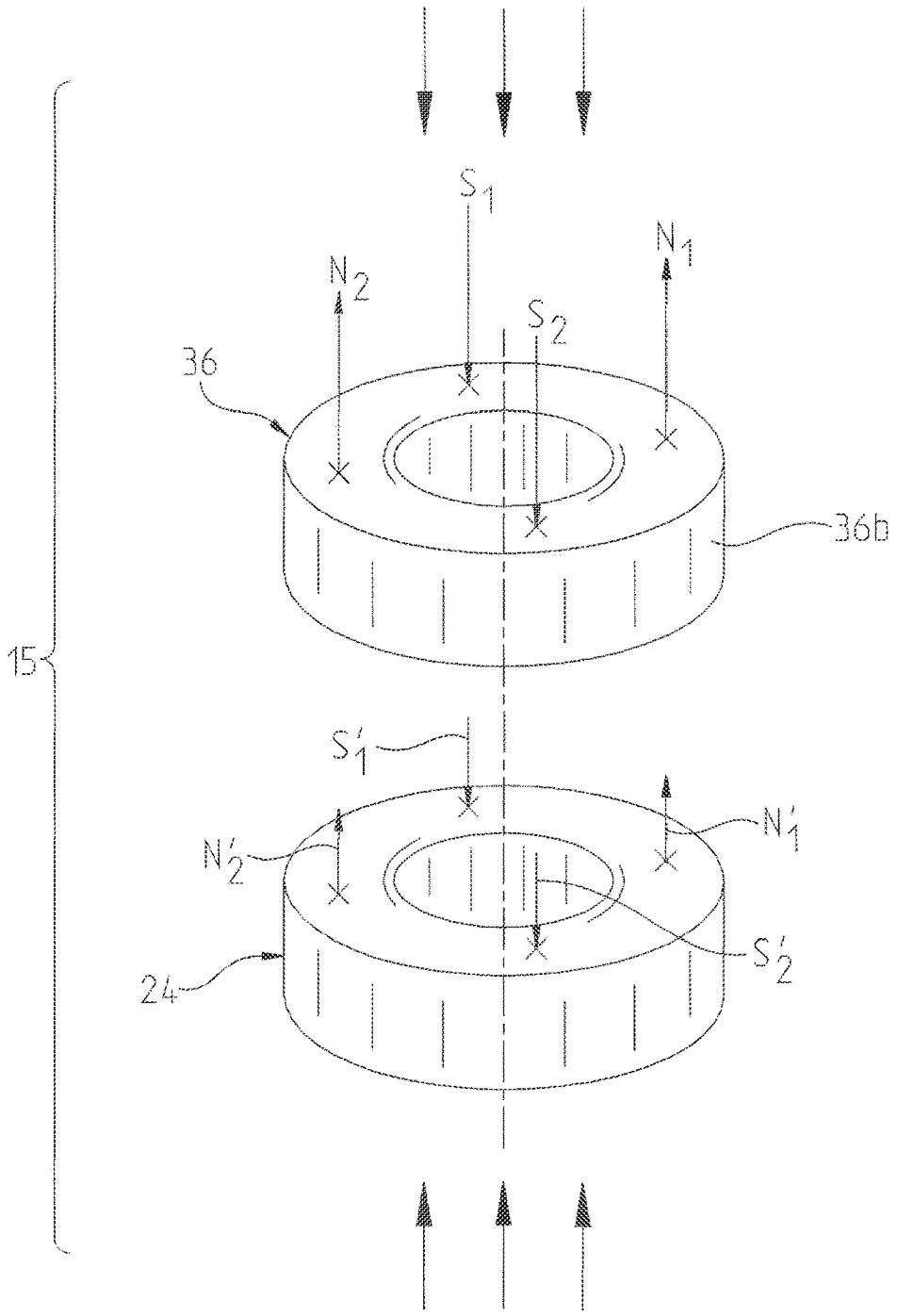
FIG. 8A is diagrammatic view of the magnetic coupling of the faucet of FIG. 4 in the attracting mode.
Figure 8B:
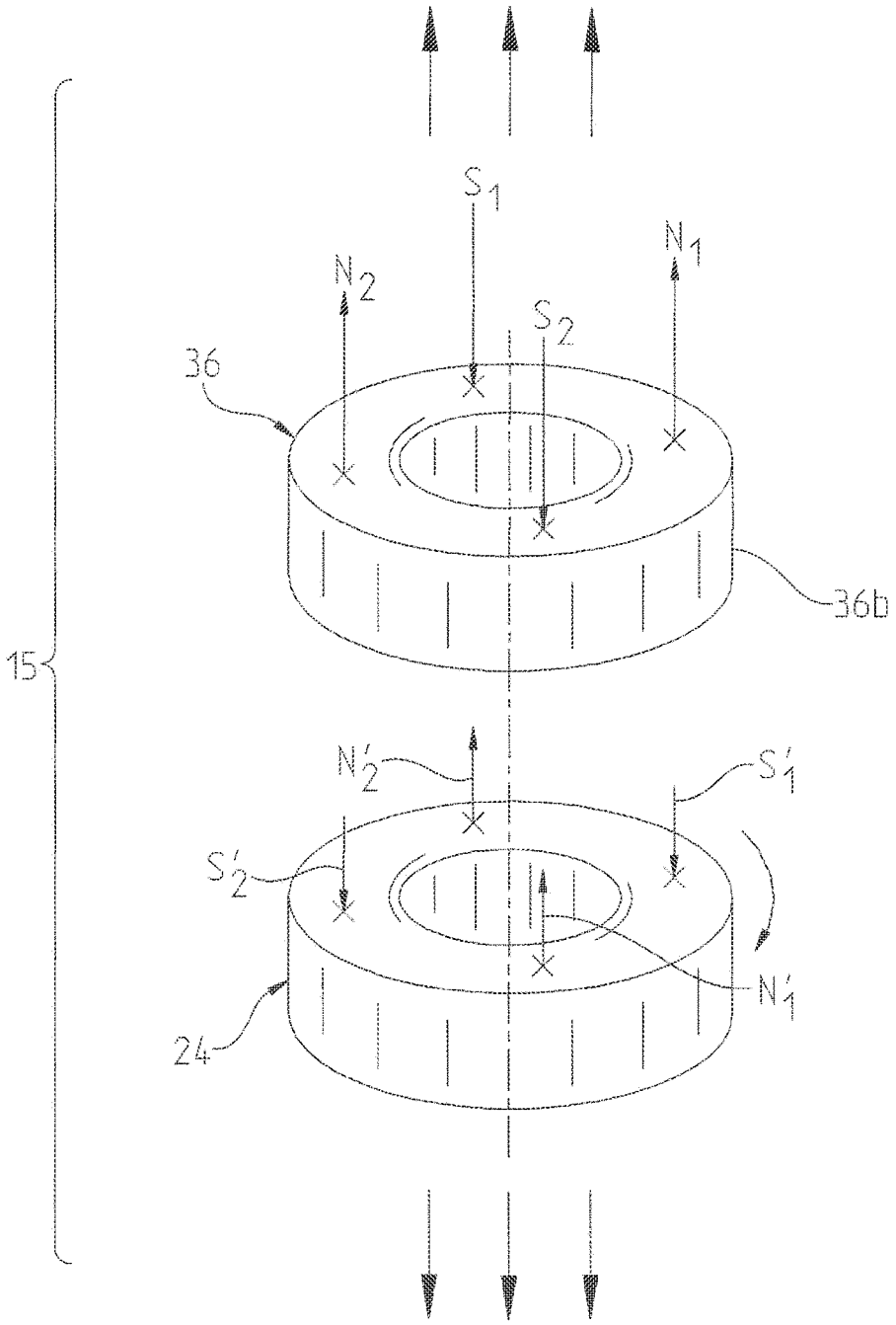
FIG. 8B is a diagrammatic view of the magnetic coupling of the faucet of FIG. 4 in the repelling mode.

As shown in FIGS. 8A and 8B, magnetic coupling 15 may be bi-modal in that it includes an attracting mode (FIG. 8A) and a repelling mode (FIG. 8B), and may be adjusted between the two modes. In this case, as further shown in FIGS. 6D, 8A, and 8B, connecting element 36b of body connector 36 includes multiple magnetic fields $S_1$, $N_1$, $S_2$, $N_2$ arranged alternately in opposing directions. Similarly, as shown in FIGS. 7A, 7B, 8A, and 8B, head connector 24 includes multiple magnetic fields $S_1'$, $N_1'$, $S_2'$, $N_2'$ arranged alternately in opposite directions. With reference to FIG. 8A, in the attracting mode, head connector 24 is arranged relative to body connector 36 such that magnetic fields $S_1'$, $N_1'$, $S_2'$, and $N_2'$ of head connector 24 are aligned with and oriented in the same direction as magnetic fields $S_1$, $N_1$, $S_2$, and $N_2$ of body connector 36, respectively. In this orientation, when head connector 24 is brought in close proximity to body connector 36, the two are attracted to one another, as indicated by the solid-headed arrows. Turning to FIG. 8B, head connector 24 has been rotated clockwise by approximately 90 degrees, such that magnetic fields $S_1'$, $N_1'$, $S_2'$, and $N_2'$ of head connector 24 are now aligned with and oriented in directions opposite to magnetic fields $N_1$, $S_2$, $N_2$ and $S_1$, respectively, of body connector 36. In this orientation, when head connector 24 is brought in close proximity to body connector 36, the two are repelled from one another as indicated by the solid-headed arrows.

Referring to FIGS. 3, 4, 8A, and 8B, in practical operation of faucet 1, magnetic coupling 15 releasably couples sprayhead 10 to neck 32 of faucet body 14 using the attracting mode shown in FIG. 8A. In other words, magnetic fields $S_1$, $N_1$, $S_2$, and $N_2$ of body connector 36 are respectively aligned with and oriented in the same direction as magnetic fields $S_1'$, $N_1'$, $S_2'$, and $N_2'$ of head connector 24, such that head connector 24 and the remaining components of sprayhead 10 are attracted and held to body connector 36, as shown in FIG. 4. When the user desires to pull sprayhead 10 out from neck 32, the user may simply pull sprayhead 10 away from neck 32 with enough force to overcome the attracting magnetic forces between head connector 24 and body connector 36. To ease the release of sprayhead 10 from neck 32, the user may also rotate sprayhead 10 by approximately 90 degrees and, thus, head connector 24, until magnetic coupling 15 exhibits its repelling mode, shown in FIG. 8B. In other words, sprayhead 10 may be rotated until magnetic fields $S_1'$, $N_1'$, $S_2'$, and $N_2'$ of head connector 24 are oriented in opposite directions relative to magnetic fields $N_1$, $S_2$, $N_2$ and $S_1$ of body connector 36. In this orientation, coupling 15 assists the user in pulling sprayhead 10 from neck 32 by providing a repelling force that repels head connector 24 from body connector 36.

Figure 9:
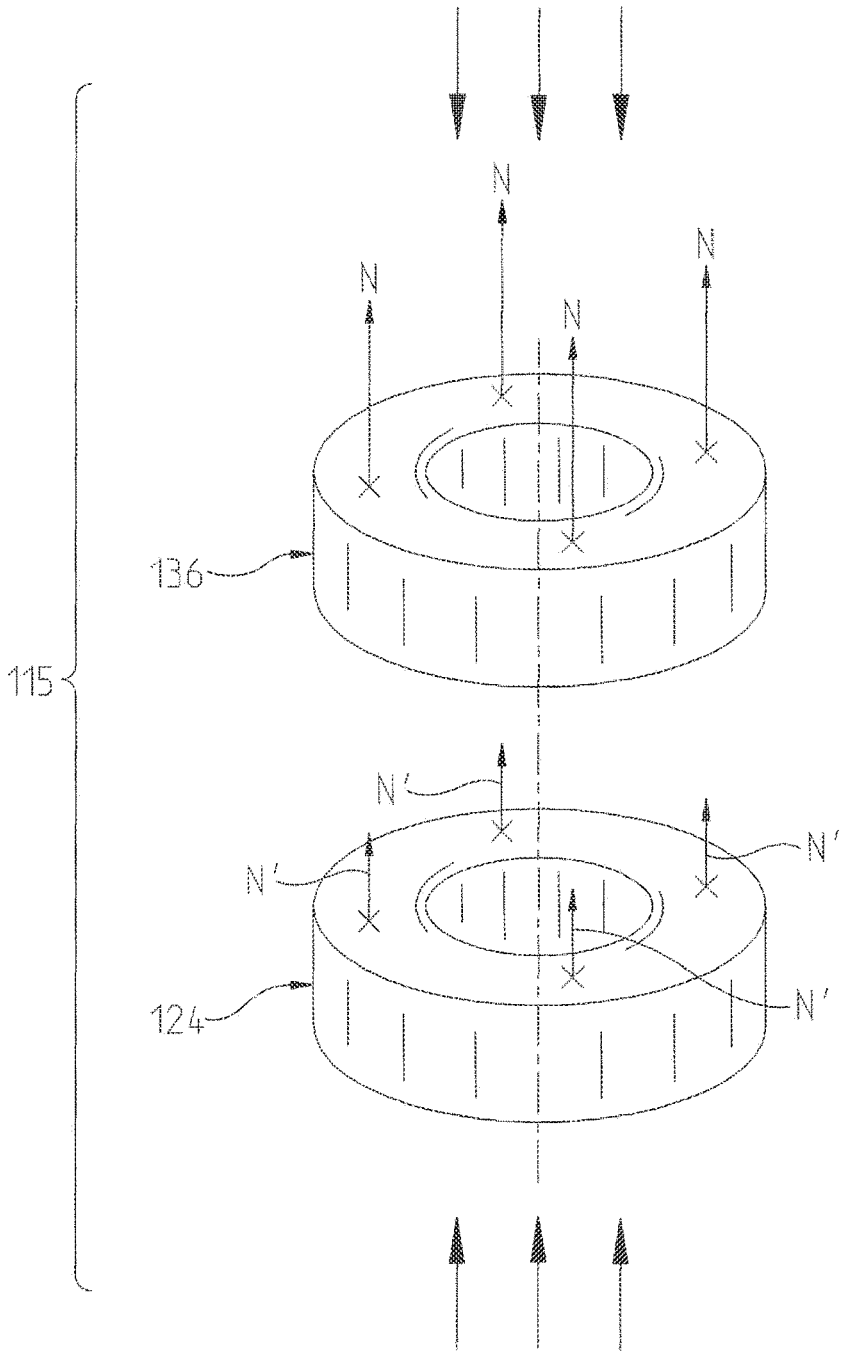
FIG. 9 is a diagrammatic view of an alternative magnetic coupling for use in the faucet of FIG. 4.

The magnetic coupling of sprayhead 10 to body 14 may be achieved without the use of multi-field magnets. Faucet 1 may be equipped with uni-modal magnetic coupling 115 through the use of dipolar magnets, as schematically illustrated in FIG. 9. Magnetic coupling 115 includes head connector 124 and body connector 136, which may be respectively coupled to sprayhead 10 and body 14 in a manner similar to that of magnetic coupling 15 described above. Head connector 124 includes only one magnetic field N, while body connector 136 includes only one magnetic field N', which is oriented in the same direction as magnetic field N. Accordingly, when the sprayhead 10 is brought in close proximity to neck 32 of faucet body 14, body connector 136 attracts and holds head connector 124 thereto. To release sprayhead 10 from neck 32, the user pulls sprayhead 10 away from neck 32 with enough force to overcome the attractive force between body connector and head connectors 136 and 124.

Figure 10:
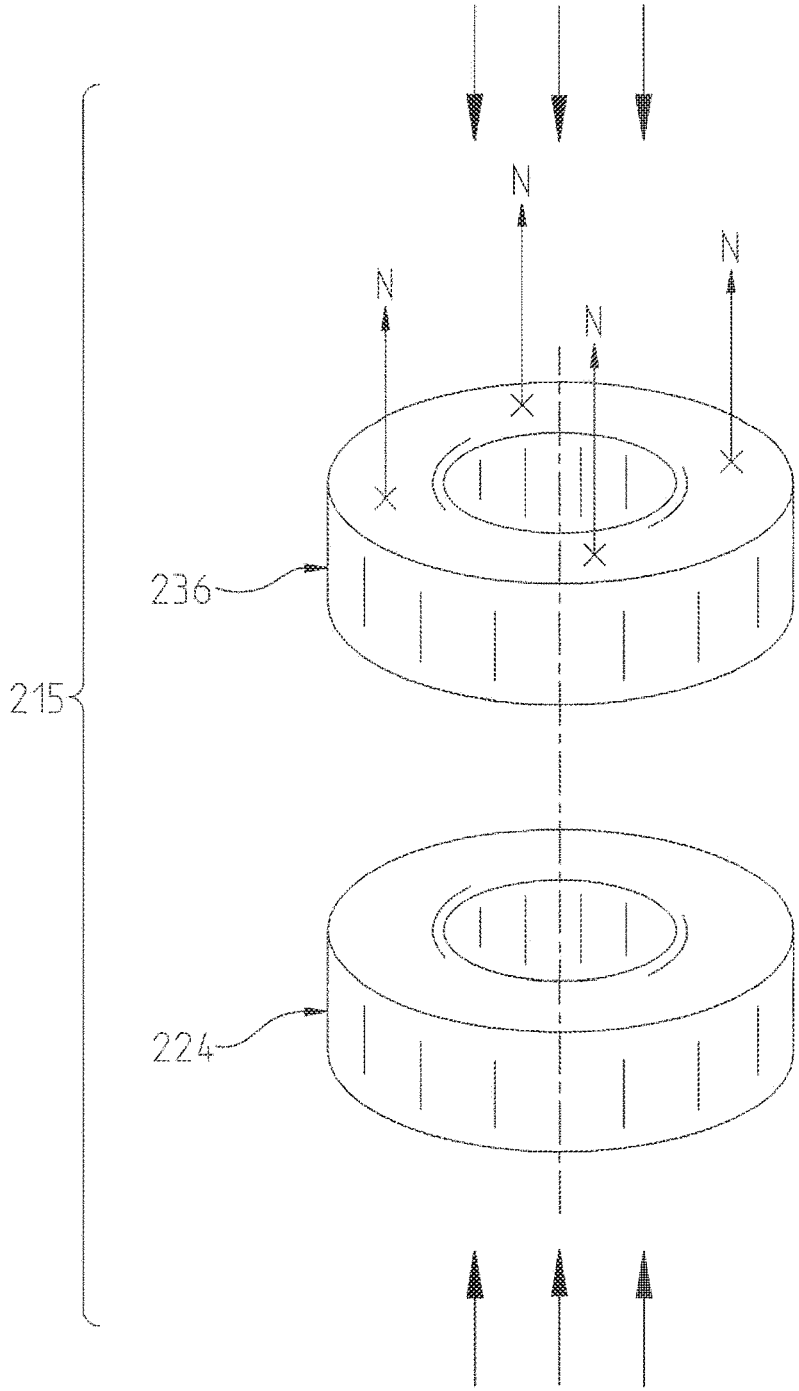
FIG. 10 is a diagrammatic view of another alternative magnetic coupling for use in the faucet of FIG. 4.

The magnetic coupling need not employ two magnets. For instance, as schematically illustrated in FIG. 10, magnetic coupling 215 includes body connector 236, which is a dipolar magnet having single magnetic field N, and head connector 224, which is formed of a magnetically attractable material, such as iron or steel. Head connector 224 and body connector 236 may be coupled to sprayhead 10 and neck 32, respectively, in a manner similar to that of connectors 24, 36 described above. Sprayhead 10 is releasably held to neck 32 of faucet body 14 by the attractive force between magnetic body connector 236 and attractable head connector 224. Either one of body connector 236 or head connector 224 may be the magnet, and the other may be formed of the magnetically attractable material.

Figure 14:
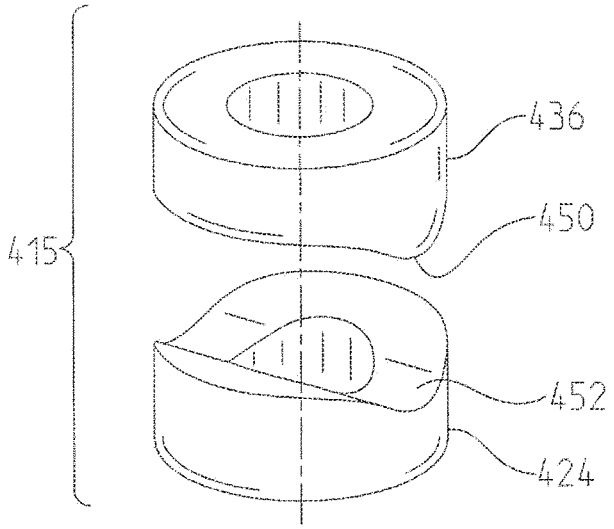
FIGS. 14, 14A and 14B are diagrammatic views of yet another alternative magnetic coupling for use in the faucet of FIG. 4 illustrating various orientations of the head connector and body connector.
Figure 14A:
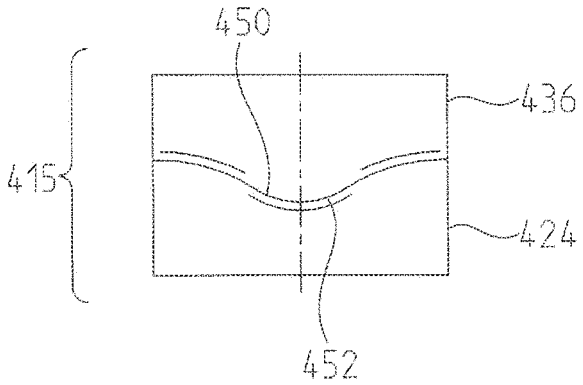
Figure 14B:
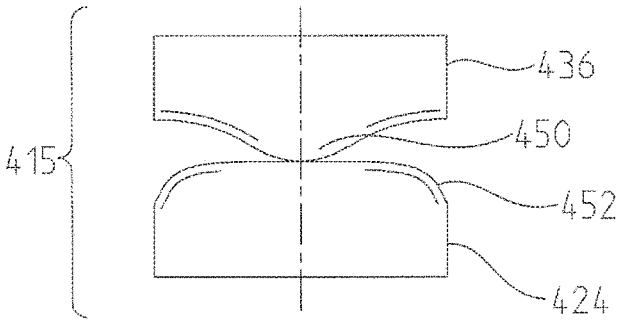

Turning now to FIGS. 14, 14A, and 14B, additional physical or structural features may be employed to guide the user in aligning and coupling the sprayhead 10 to the body 14 and releasing the sprayhead 10 from the body 14. For instance, magnetic coupling 415 includes head connector 424 and body connector 436, which may be respectively coupled to sprayhead 10 and body 14, as described above. Head connector 424 and body connector 436 may be configured like any of the embodiments described above. Body connector 436 includes male component 450 in the form of a curved ridge or protrusion. Head connector 424 includes female component 452 in the form of a curved recess configured to mate with and receive male component 450.

FIGS. 14 and 14A show head connector 424 and body connector 436 in an aligned position such that female component 452 receives male component 450. When in this position, head connector 424 may be brought in closer proximity to body connector 436, thereby maximizing the strength of magnetic attraction.

FIG. 14B shows head connector 424 and body connector 436 in a misaligned position. In this position male member 450 separates body connector 436 from head connector 424 to thereby reduce the magnetic force therebetween and allow the user to more easily pull the sprayhead 10 from the faucet body 14. Male and female members 450 and 452 may have any shape such as rectangular or triangular. However, in this particular embodiment, the curved, sloping shape of female and male members 452 and 450 may also facilitate the user's rotation of head connector 424 relative to body connector 436 to reduce the attractive force between them. In the case where magnetic coupling 415 is a bimodal coupling, such as that in FIGS. 8A and 8B, rotation of head connector 424 relative to body connector 436 generates a repulsive force between them.

Figure 15A:
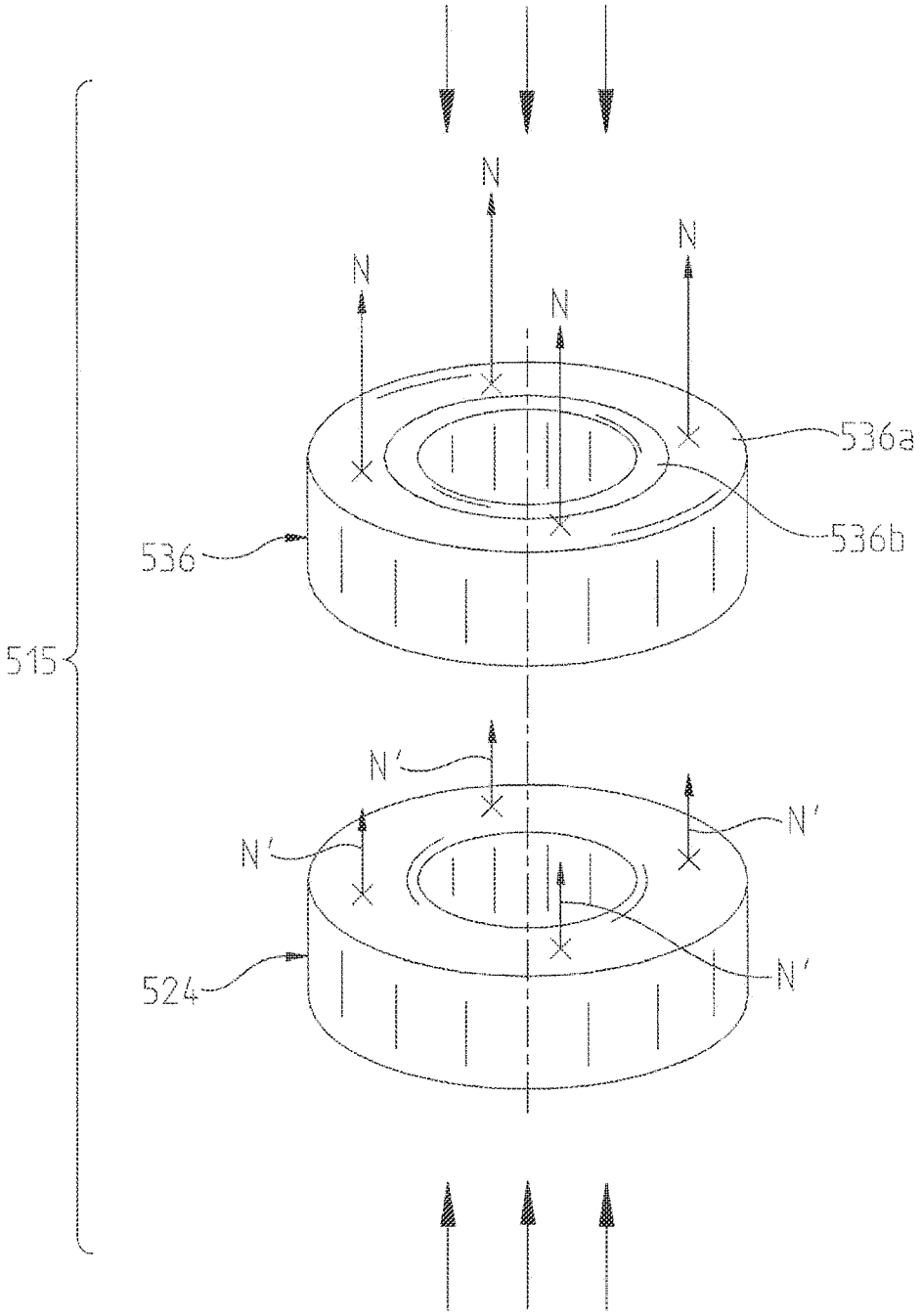
FIG. 15A is a diagrammatic view of yet another magnetic coupling for use in the faucet of FIG. 4, wherein the magnetic coupling is in the attracting mode.
Figure 15B:
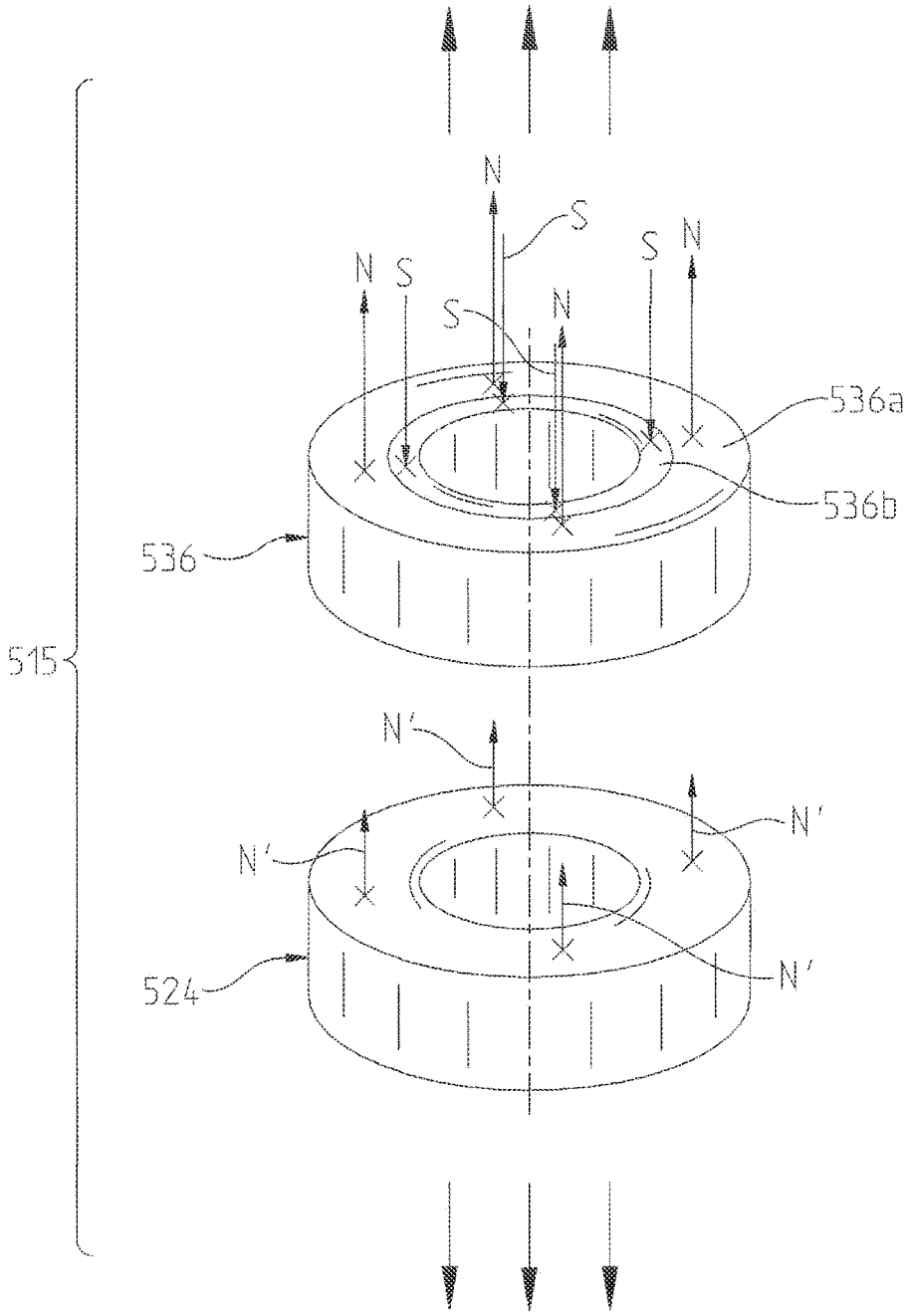
FIG. 15B is a diagrammatic view of the magnetic coupling of FIG. 15A, wherein the magnetic coupling is in the repelling mode.

Any of the above-described embodiments may also include an electromagnet. For instance, either the head connector or the body connector may include an electromagnet switchable between an energized state and a de-energized state. As illustrated in FIGS. 15A and 15B, magnetic coupling 515 includes head connector 524 and body connector 536, which may be respectively coupled to sprayhead 10 and body 14 in the manner described above. Body connector 536 includes a permanent magnetic portion 536a having magnetic field N. Head connector 524 is a permanent magnet having magnetic field N', which is oriented in the same direction as magnetic field N. Accordingly, head connector 524 attracts and holds body connector 536 thereto via the attracting forces between magnetic fields N', N, as illustrated by the solid headed arrows in FIG. 15A. Body connector 536 also includes electromagnet portion 536b, which is coupled to an energy source, such as a battery, by any known means and is capable of being energized and de-energized by any known means, such as by employing an on/off power switch. Electromagnet portion 536b, when energized, is configured to generate magnetic field S, which is oriented in the opposite direction to magnetic field N of permanent magnet portion 536a of body connector 536. Therefore, when energized, electromagnet portion 536b cancels out the attractive force between magnetic fields N, N' and illustratively repels head connector 524 from body connector 536 to, thereby, ease the release of sprayhead 10 from body 14. When not energized, electromagnet portion 536b generates no magnetic field, thereby allowing head connector 524 to be attracted and held to body connector 536. It should be noted that the electromagnet may be disposed on either of body connector 536 or head connector 524, and may be employed in any of the magnetic coupling embodiments described above.

Figure 16:
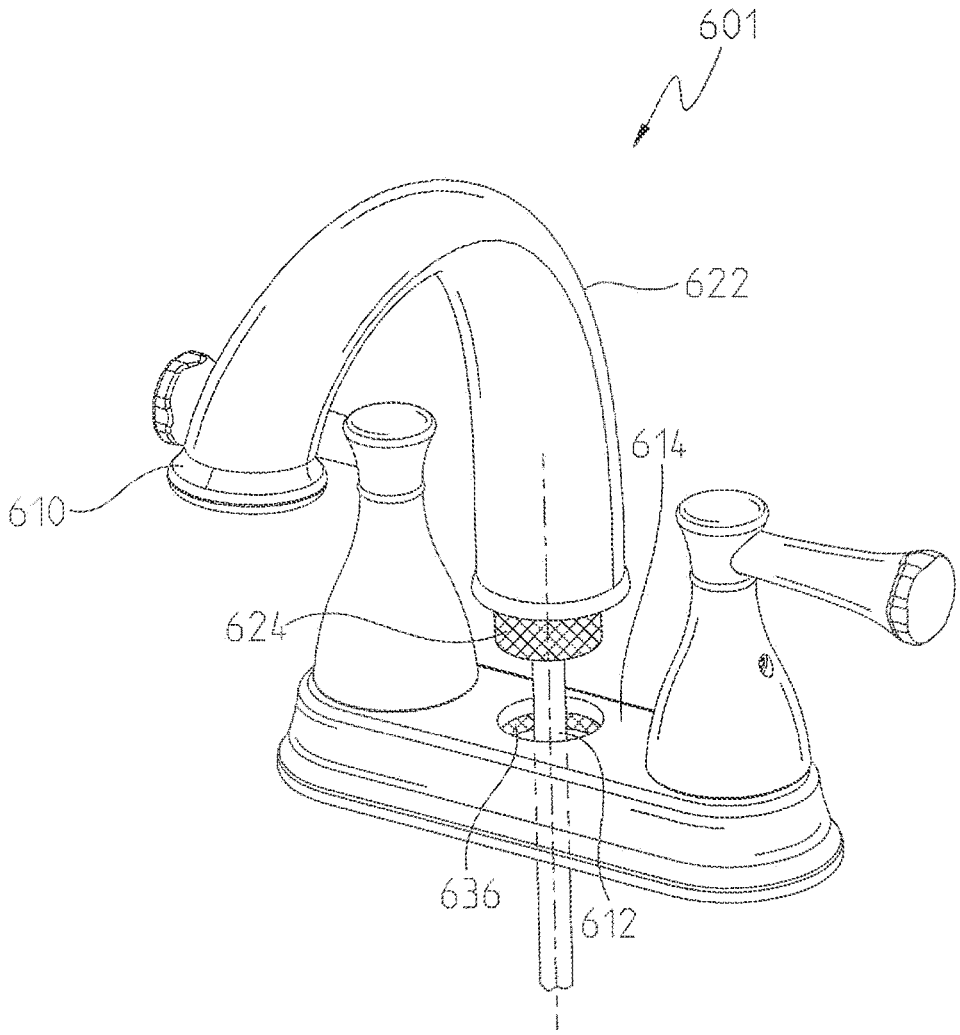
FIG. 16 is a perspective view of a faucet in accordance with another illustrative embodiment of the present invention.

Turning to FIG. 16, faucet 601 is illustrated. Faucet 601 is of a different design than faucet 1 of FIGS. 1-2, but may still employ any of the magnetic coupling embodiments described above. Faucet 601 includes body 614 and sprayhead 610, which is releasably coupled to body 614. Neck or delivery spout 622 is part of sprayhead 610 and, thus, is removable from body 614 along with sprayhead 610. Sprayhead 610 includes head connector 624 and is coupled to water line 612. Body 614 includes body connector 636. Head connector 624 and body connector 636 cooperate with one another to form a magnetic coupling, such as those described above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A faucet comprising:

a supply hose adapted to supply water;

a faucet head fluidly coupled to the supply hose and including a user input configured to control dispensing of water;

a faucet body adapted to support the faucet head and including a delivery spout receiving the supply hose, such that the faucet head extends from an end of the delivery spout;

a magnetic coupling configured to removably couple the faucet head to the faucet body, the magnetic coupling [including a first member operably coupled to the faucet head, and a second member operably coupled to the faucet body, at least one of the first member and the second member] including a magnet *operably coupled to at least one of the faucet head and the faucet body*; [and]

cooperating orientation members configured to rotationally orient the faucet head relative to the delivery spout for locating the user input for a user, the cooperating orientation members including a protrusion supported by one of the faucet head and the faucet body, and a recess supported by the other of the faucet body and the faucet head and configured to receive the protrusion to position the user input in a desired rotational orientation*; and*

*wherein the magnet is at least partially overmolded with a polymer, the polymer being formed into a connector adapted to couple the magnet to one of the faucet head and the faucet spout.*

2. The faucet of claim 1, wherein the magnetic coupling requires between 2.0 *pounds* and 12.0 pounds of force to pull the faucet head from the delivery spout.

3. The faucet of claim [2] *1*, wherein the magnet has a magnetic field of between 400 *gauss* and 2,000 gauss tested at a distance of 0.090 inches.

4. The faucet of claim 1, wherein *the magnetic coupling includes a first member operably coupled to the faucet head, a second member operably coupled to the faucet body, at least one of the first member and the second member includes the magnet, and* at least one of the first member and the second member includes an attracted member magnetically attracted to the magnet.

5. The faucet of claim 4, wherein the first member includes the attracted member, and the second member includes the magnet.

6. The faucet of claim 4, wherein the first member includes the magnet, and the second member includes the attracted member.

7. The faucet of claim 1, wherein the magnetic coupling includes a coupling surface having an area of between 0.4 square inches and 2.0 square inches.

[8. The faucet of claim 1, wherein the magnet is at least partially overmolded with a polymer, the polymer being formed into a connector adapted to couple the magnet to one of the faucet head and the faucet spout.]

9. [The faucet of claim 1,] *A faucet comprising:*

*a supply hose adapted to supply water;*

*a faucet head fluidly coupled to the supply hose and including a user input configured to control dispensing of water;*

*a faucet body adapted to support the faucet head and including a delivery spout receiving the supply hose, such that the faucet head extends from an end of the delivery spout;*

*a magnetic coupling configured to removably couple the faucet head to the faucet body, the magnetic coupling including a magnet operably coupled to at least one of the faucet head and the faucet body;*

*cooperating orientation members configured to rotationally orient the faucet head relative to the delivery spout for locating the user input for a user, the cooperating orientation members including a protrusion supported by one of the faucet head and the faucet body, and a recess supported by the other of the faucet body and the faucet head and configured to receive the protrusion to position the user input in a desired rotational orientation; and* wherein the magnetic coupling further includes a backing member configured to increase a magnetic flux of the magnet.

10. The faucet of claim 1, wherein the user input is a lever operably coupled to a valve.

11. The faucet of claim 1, wherein *the magnetic coupling includes a first member operably coupled to the faucet head, a second member operably coupled to the faucet body, at least one of the first member and the second member includes the magnet, and* the cooperating orientation members comprise the first member and the second member of the magnetic coupling.

[12. A faucet comprising:

a supply hose adapted to supply water;

a faucet head fluidly coupled to the supply hose and including a user input configured to control dispensing of water;

a faucet body adapted to support the faucet head and including a delivery spout receiving the supply hose, such that the faucet head extends from an end of the delivery spout;

a magnetic coupling configured to removably couple the faucet head to the faucet body, the magnetic coupling including a first member operably coupled to the faucet head, and a second member operably coupled to the faucet body, at least one of the first member and the second member including a magnet;

cooperating orientation members configured to rotationally orient the faucet head relative to the delivery spout for locating the user input for a user;

wherein the cooperating orientation members comprise the first member and the second member of the magnetic coupling; and wherein:

the first member includes a first magnet including multiple magnetic fields;

the second member includes a second magnet including multiple magnetic fields; and at least one of the multiple magnetic fields of each of the first magnet and the second magnet is oriented in a first direction, and at least one of the multiple magnetic fields of each of the first magnet and the second magnet is oriented in second direction, the second direction is substantially opposite the first direction, such that the magnetic coupling exhibits alternate attracting and repelling modes of operation, and the magnetic coupling rotationally orients the faucet head relative to the delivery spout for locating the user input for a user.]

13. A faucet comprising:

a faucet head;

a supply tube fluidly coupled to the faucet head;

a faucet body including a dispensing end having a wall, the wall having an internal surface and an external surface, the internal surface defining an elongate passageway, the supply tube passing through the elongate passageway;

a user input supported by the faucet head and configured to control dispensing of water through the supply tube;

a magnetic coupling releasably coupling the faucet head to the dispensing end of the faucet body, the magnetic coupling including a first member and a second member, the first member including a magnet coupled to at least one of the faucet head or the faucet body; and cooperating orientation members configured to rotationally orient the faucet head relative to the faucet body for locating the user input for a user, the cooperating orientation members including a protrusion supported by one of the faucet head and the faucet body, and a recess supported by the other of the faucet body and the faucet head and configured to receive the protrusion to position the user input in a desired rotational orientation*; and*

*wherein the magnetic coupling further includes a backing member configured to increase a magnetic flux of the magnet.*

14. The faucet of claim 13, wherein the magnetic coupling requires between 2.0 *pounds* and 12.0 pounds of force to pull the faucet head from the faucet body.

15. The faucet of claim 13, wherein the magnet has a magnetic field of between 400 *gauss* and 2,000 gauss tested at a distance of 0.090 inches.

16. The faucet of claim 13, wherein at least one of the first member and the second member includes an attracted member magnetically attracted to the magnet.

17. The faucet of claim 16, wherein the first member includes the attracted member, and the second member includes the magnet.

18. The faucet of claim 16, wherein the first member includes the magnet, and the second member includes the attracted member.

19. The faucet of claim 13, wherein the magnetic coupling includes a coupling surface having an area of between 0.4 square inches and 2.0 square inches.

20. [The faucet of claim 13,] *A faucet comprising:*

*a faucet head;*

*a supply tube fluidly coupled to the faucet head;*

*a faucet body including a dispensing end having a wall, the wall having an internal surface and an external surface, the internal surface defining an elongate passageway, the supply tube passing through the elongate passageway;*

*a user input supported by the faucet head and configured to control dispensing of water through the supply tube;*

*a magnetic coupling releasably coupling the faucet head to the dispensing end of the faucet body, the magnetic coupling including a first member and a second member, the first member including a magnet coupled to at least one of the faucet head or the faucet body; and cooperating orientation members configured to rotationally orient the faucet head relative to the faucet body for locating the user input for a user, the cooperating orientation members including a protrusion supported by one of the faucet head and the faucet body, and a recess supported by the other of the faucet body and the faucet head and configured to receive the protrusion to position the user input in a desired rotational orientation; and* wherein the magnet is at least partially overmolded with a polymer, the polymer being formed into a connector adapted to couple the magnet to one of the faucet head and the faucet spout.

[21. The faucet of claim 13, wherein the magnetic coupling further includes a backing member configured to increase a magnetic flux of the magnet.]

22. The faucet of claim 13, wherein the user input is a lever operably coupled to a valve.

23. The faucet of claim 13, wherein the cooperating orientation members comprise the first member and the second member of the magnetic coupling.

[24. A faucet comprising:

a faucet head;

a supply tube fluidly coupled to the faucet head;

a faucet body including a dispensing end having a wall, the wall having an internal surface and an external surface, the internal surface defining an elongate passageway, the supply tube passing through the elongate passageway;

a user input supported by the faucet head and configured to control dispensing of water through the supply tube;

a magnetic coupling releasably coupling the faucet head to the dispensing end of the faucet body, the magnetic coupling including a first member and a second member, the first member including a magnet coupled to at least one of the faucet head or the faucet body;

cooperating orientation members configured to rotationally orient the faucet head relative to the faucet body for locating the user input for a user;

wherein the cooperating orientation members comprise the first member and the second member of the magnetic coupling; and wherein:

the first member includes a first magnet including multiple magnetic fields;

the second member includes a second magnet including multiple magnetic fields; and at least one of the multiple magnetic fields of each of the first magnet and the second magnet is oriented in a first direction, and at least one of the multiple magnetic fields of each of the first magnet and the second magnet is oriented in second direction, the second direction is substantially opposite the first direction, such that the magnetic coupling exhibits alternate attracting and repelling modes of operation, and the magnetic coupling rotationally orients the faucet head relative to the delivery spout for locating the user input for a user.]

[25. A method of coupling a faucet head to a faucet body, the method including the steps of:

providing a supply hose for supplying water;

providing a faucet head fluidly coupled to the supply hose and including a user input for controlling a valve;

providing a faucet body for supporting the faucet head and including a delivery spout;

coupling the faucet head to the faucet body through a magnetic coupling; and aligning cooperating orientation members to rotationally orient the faucet head relative to the delivery spout for locating the user input in a desired rotational orientation for a user, the cooperating orientation members including a protrusion supported by one of the faucet head and the faucet body, and a recess supported by the other of the faucet body and the faucet head and configured to receive the protrusion to position a user input in the desired rotational orientation.]

[26. The method of claim 25, further comprising the step of controlling the user input to control the dispensing of water through the faucet head.]

[27. The method of claim 25, wherein the magnetic coupling requires between 2.0 and 12.0 pounds of force to pull the faucet head from the delivery spout.]

[28. The method of claim 25, wherein the magnetic coupling includes a first member operably coupled to the faucet head, and a second member operably coupled to the faucet body, at least one of the first member and the second member including a magnet.]

[29. The method of claim 28, wherein the magnet has a magnetic field of between 400 and 2,000 gauss tested at a distance of 0.090 inches.]

[30. The method of claim 29, wherein the magnetic coupling includes a coupling surface having an area of between 0.4 square inches and 2.0 square inches.]

*31. The faucet of claim 2, wherein the magnetic coupling requires between 3.0 pounds and 8.0 pounds of force to pull the faucet head from the delivery spout.*

*32. The faucet of claim 3, wherein the magnet has a magnetic field of between 500 gauss and 1,000 gauss tested at a distance of 0.090 inches.*

*33. The faucet of claim 7, wherein the magnetic coupling includes a coupling surface having an area of between 0.5 square inches and 1.0 square inches.*

*34. The faucet of claim 14, wherein the magnetic coupling requires between 3.0 pounds and 8.0 pounds of force to pull the faucet head from the faucet body.*

*35. The faucet of claim 15, wherein the magnet has a magnetic field of between 500 gauss and 1,000 gauss tested at a distance of 0.090 inches.*

*36. The faucet of claim 19, wherein the magnetic coupling includes a coupling surface having an area of between 0.5 square inches and 1.0 square inches.*

*37. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising a first coupling member operably coupled to the faucet spout and including a first magnetically attractive member, and a second coupling member operably coupled to the faucet sprayhead and including a second magnetically attractive member;*

*cooperating orientation members configured to rotationally orient the faucet sprayhead relative to the faucet spout for locating a user input for a user;*

*wherein the magnetic coupling requires between 2.0 and 12.0 pounds of force to pull the faucet sprayhead from the faucet spout; and*

*wherein at least one of the first coupling member includes an overmold over the first magnetically attractive member, and the second coupling member includes an overmold over the second magnetically attractive member.*

*38. The faucet of claim 37, wherein at least one of the first magnetically attractive member and the second magnetically attractive member has a magnetic field of between 400 gauss and 2,000 gauss tested at a distance of 0.0900 inches.*

*39. The faucet of claim 38, wherein the magnetic field is between 500 gauss and 1,000 gauss tested at a distance of 0.090 inches.*

*40. The faucet of claim 37, wherein:*

*the first coupling member comprises a base portion formed from a non-magnetic material and the first magnetically attractive member, the base portion is disposed in the elongate passageway of the faucet spout, and the water supply line passes through the first coupling member; and*

*the second coupling member is supported for movement with the faucet sprayhead and comprises the second magnetically attractive member.*

*41. The faucet of claim 40, wherein the first magnetically attractive member is attached to the base portion at a location that is spaced from the outlet end of the elongate passageway of the faucet spout and is disposed entirely within the elongate passageway of the faucet spout, and the second magnetically attractive member is disposed outside of the interior space of the outer shell of the faucet sprayhead.*

*42. The faucet of claim 41, wherein:*

*when the faucet sprayhead is connected to the faucet spout, the second magnetically attractive member is disposed within the elongate passageway, the first magnetically attractive member and the second magnetically attractive member are disposed adjacent to one another, and a central axis of the first magnetically attractive member is coaxial with a central axis of the second magnetically attractive member, the first magnetically attractive member and the second magnetically attractive member form a magnetic connection comprising an attractive magnetic force acting between the first magnetically attractive member and the second magnetically attractive member, and the magnetic connection is operable to maintain an attachment between the faucet sprayhead and the faucet spout; and*

*when the faucet sprayhead is disconnected from the faucet spout, the second magnetically attractive member is disposed outside of the elongate passageway of the faucet spout in a spaced relationship to the outlet end of the elongate passageway of the faucet spout.*

*43. The faucet of claim 42, wherein when the magnetic connection is operable to maintain the attachment between the faucet sprayhead and the faucet spout, the magnetic coupling does not prohibit the faucet sprayhead from rotating relative to the faucet spout about the central axis of the second magnetically attractive member.*

*44. The faucet of claim 42, wherein the first magnetically attractive member is supported in the faucet spout in a ring arrangement to define an opening and the water supply line comprises a tube passing through the opening of the first magnetically attractive member.*

*45. The faucet of claim 44, wherein the first magnetically attractive member includes a continuous annular body.*

*46. The faucet of claim 40, wherein the first magnetically attractive member comprises a magnet, and the base portion is formed from a polymer.*

*47. The faucet of claim 40, further comprising a coupling portion retaining the first magnetically attractive member to the base portion.*

*48. The faucet of claim 47, wherein the coupling portion includes a lip on one of the base portion and the first magnetically attractive member, the lip engaging a surface on the other of the first magnetically attractive member and the base portion.*

*49. The faucet of claim 40, wherein:*

*the faucet spout includes a wall defining the elongate passageway, the wall including a recess; and*

*the base portion includes a protrusion received within the recess of the faucet spout.*

*50. The faucet of claim 37, wherein the magnetic coupling includes an attracting mode of operation and a repelling mode of operation.*

*51. The faucet of claim 37, wherein, when the faucet sprayhead is connected to the faucet spout, the first magnetically attractive member and the second magnetically attractive member are disposed proximate to one another.*

*52. The faucet of claim 51, wherein:*

*the first magnetically attractive member has a lower surface;*

*the second magnetically attractive member has an upper surface; and*

*when the faucet sprayhead is connected to the faucet spout, the lower surface of the first magnetically attractive member faces the upper surface of the second magnetically attractive member.*

*53. The faucet of claim 37, wherein the second magnetically attractive member is disposed at least partially within the interior space of the outer shell of the faucet sprayhead.*

*54. The faucet of claim 37, wherein the waterway is a tubular member positioned in the interior space of the outer shell.*

*55. The faucet of claim 37, wherein the second magnetically attractive member is supported by the waterway.*

*56. The faucet of claim 55, wherein the second magnetically attractive member is operably coupled to the receiving end of the waterway.*

*57. The faucet of claim 37, wherein the magnetic coupling includes a coupling surface having an area of between 0.4 square inches and 2.0 square inches.*]

*58. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising a first coupling member operably coupled to the faucet spout and including a first magnetically attractive member, and a second coupling member operably coupled to the faucet sprayhead and including a second magnetically attractive member;*

*cooperating orientation members configured to rotationally orient the faucet sprayhead relative to the faucet spout for locating a user input for a user;*

*wherein the magnetic coupling requires between 2.0 and 12.0 pounds of force to pull the faucet sprayhead from the faucet spout;*

*wherein:*

*at least one of the first magnetically attractive member and the second magnetically attractive member comprises a magnet and a backing member; and*

*the at least one of the first magnetically attractive member and the second magnetically attractive member has a magnetic field of between 400 gauss and 2,000 gauss tested at a distance of 0.090 inches.*

*59. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising a first coupling member operably coupled to the faucet spout and including a first magnetically attractive member, and a second coupling member operably coupled to the faucet sprayhead and including a second magnetically attractive member;*

*cooperating orientation members configured to rotationally orient the faucet sprayhead relative to the faucet spout for locating a user input for a user;*

*wherein the magnetic coupling requires between 2.0 and 12.0 pounds of force to pull the faucet sprayhead from the faucet spout;*

*wherein:*

*the first magnetically attractive member comprises a first magnet and a first backing member; and*

*the base portion comprises a polymer material molded over at least a portion of the first magnet and the first backing member.*

*60. A faucet comprising:*

*a support body comprising a passageway having an opening;*

*a water supply line comprising a tube passing through the passageway of the support body and passing through the opening;*

*a pull-out faucet sprayhead detachably connected to the support body and comprising an outer shell and a water outlet in fluid communication with the water supply line;*

*a magnetic coupling detachably coupling the faucet sprayhead to the support body, the magnetic coupling comprising:*

*a first coupling member comprising a first magnetically attractive member disposed within the passageway of the support body, wherein the first magnetically attractive member at least partially concentrically surrounds a perimeter of the tube of the water supply line;*

*a second coupling member moveable with the faucet sprayhead and comprising a second magnetically attractive member operably coupled to the outer shell of the faucet sprayhead;*

*cooperating orientation members configured to rotationally orient the faucet sprayhead relative to the support body for locating a user input for a user;*

*wherein the magnetic coupling requires between 2.0 pounds and 12.0 pounds of force to pull the faucet sprayhead from the support body;*

*wherein at least one of the first magnetically attractive member and the second magnetically attractive member has a magnetic field of between 400 gauss and 2,000 gauss tested at a distance of 0.090 inches; and*

*wherein the first coupling member further comprises a base portion formed from a non-magnetic material, the*

*base portion disposed in the passageway of the support body, and the water supply line passes through the first coupling member;*

*the first magnetically attractive member comprises a first magnet and a first backing member; and*

*the base portion comprises a polymer material molded over at least a portion of the first magnet and the first backing member.*

*61. The faucet of claim 60 wherein first magnetically attractive member is disposed entirely within the passageway of the support body and spaced from the opening of the passageway.*

*62. The faucet of claim 61, wherein the second magnetically attractive member is disposed entirely outside of the outer shell of the faucet sprayhead.*

*63. The faucet of claim 60, wherein the magnetic coupling requires between 3.0 pounds and 8.0 pounds of force to pull the faucet head from the support body.*

*64. The faucet of claim 60, wherein the magnetic field is between 500 gauss and 1,000 gauss tested at a distance of 0.090 inches.*

*65. The faucet of claim 60, wherein:*

*when the faucet sprayhead is connected to the support body, the second magnetically attractive member is disposed entirely within the passageway and is nested within the first magnetically attractive member and an attractive magnetic force acts between the first magnetically attractive member and the second magnetically attractive member; and*

*when the faucet sprayhead is disconnected from the support body, the second magnetically attractive member is disposed outside of the passageway in a spaced relationship to the opening of the passageway.*

*66. The faucet of claim 60, wherein, when the faucet sprayhead is connected to the support body, the first magnetically attractive member and the second magnetically attractive member are disposed adjacent to one another, and a central axis of the first magnetically attractive member is coaxial with a central axis of the second magnetically attractive member.*

*67. The faucet of claim 66, wherein, when the faucet sprayhead is connected to the support body, the second magnetically attractive member is disposed within the passageway.*

*68. The faucet of claim 60, wherein at least one of the first magnetically attractive member and the second magnetically attractive member comprises a magnet.*

*69. The faucet of claim 60, wherein the support body comprises a faucet spout.*

*70. The faucet of claim 60, wherein the first magnetically attractive member is supported by the support body in a ring arrangement to define an opening, the tube passing through the opening of the first magnetically attractive member.*

*71. The faucet of claim 60, wherein the first magnetically attractive member includes a continuous annular body.*

*72. The faucet of claim 60, wherein the first magnetically attractive member is attached to the base portion at a location that is spaced from the opening of the passageway of the support body and is disposed entirely within the passageway of the support body.*

*73. The faucet of claim 60, wherein the first magnetically attractive member comprises a magnet, and the base portion is formed from a polymer.*

*74. The faucet of claim 60, further comprising a coupling portion retaining the first magnetically attractive member to the base portion.*

*75. The faucet of claim 74, wherein the coupling portion includes a lip on one of the base portion and the first magnetically attractive member, the lip engaging a surface on the other of the first magnetically attractive member and the base portion.*

*76. A faucet comprising:*

*a support body comprising a passageway having an opening;*

*a water supply line comprising a tube passing through the passageway of the support body and passing through the opening;*

*a pull-out faucet sprayhead detachably connected to the support body and comprising an outer shell and a water outlet in fluid communication with the water supply line;*

*a magnetic coupling detachably coupling the faucet sprayhead to the support body, the magnetic coupling comprising:*

*a first coupling member comprising a first magnetically attractive member disposed within the passageway of the support body, wherein the first magnetically attractive member at least partially concentrically surrounds a perimeter of the tube of the water supply line;*

*a second coupling member moveable with the faucet sprayhead and comprising a second magnetically attractive member operably coupled to the outer shell of the faucet sprayhead;*

*cooperating orientation members configured to rotationally orient the faucet sprayhead relative to the support body for locating a user input for a user;*

*wherein the magnetic coupling requires between 2.0 pounds and 12.0 pounds of force to pull the faucet sprayhead from the support body;*

*wherein at least one of the first magnetically attractive member and the second magnetically attractive member has a magnetic field of between 400 gauss and 2,000 gauss tested at a distance of 0.090 inches; and*

*wherein at least one of the first coupling member includes a polymer overmold over the first magnetically attractive member, and the second coupling member includes a polymer overmold over the second magnetically attractive member.*

*77. A faucet comprising:*

*a support body comprising a passageway having an opening;*

*a water supply line comprising a tube passing through the passageway of the support body and passing through the opening;*

*a pull-out faucet sprayhead detachably connected to the support body and comprising an outer shell and a water outlet in fluid communication with the water supply line;*

*a magnetic coupling detachably coupling the faucet sprayhead to the support body, the magnetic coupling comprising:*

*a first coupling member comprising a first magnetically attractive member disposed within the passageway of the support body, wherein the first magnetically attractive member at least partially concentrically surrounds a perimeter of the tube of the water supply line;*

*a second coupling member moveable with the faucet sprayhead and comprising a second magnetically attractive member operably coupled to the outer shell of the faucet sprayhead;*

*cooperating orientation members configured to rotationally orient the faucet sprayhead relative to the support body for locating a user input for a user;*

*wherein the magnetic coupling requires between 2.0 pounds and 12.0 pounds of force to pull the faucet sprayhead from the support body;*

*wherein at least one of the first magnetically attractive member and the second magnetically attractive member has a magnetic field of between 400 gauss and 2,000 gauss tested at a distance of 0.090 inches; and*

*wherein at least one of the first magnetically attractive member and the second magnetically attractive member comprises a magnet and a backing member.*

*78. A faucet comprising:*

*a faucet spout defining an elongate passageway having an outlet end;*

*a water supply line passing through the elongate passageway of the faucet spout;*

*a pull-out faucet sprayhead detachably connected to the faucet spout and comprising a waterway including a receiving end and a dispensing end, and a water outlet;*

*wherein the receiving end of the waterway is fluidly coupled to the water supply line, and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising:*

*a first coupling member disposed in the elongate passageway of the faucet spout and comprising a first base formed from a non-magnetic polymer and a first magnetically attractive member, wherein the first base is molded over at least a portion of the first magnetically attractive member to at least partially encapsulate the first magnetically attractive member with the first base, the first base is disposed in the elongate passageway of the faucet spout, and the water supply line passes through the first coupling member; and*

*a second coupling member supported for movement with the faucet sprayhead and comprising a second base formed from a non-magnetic polymer and a second magnetically attractive member, wherein the second base is molded over at least a portion of the second magnetically attractive member to at least partially encapsulate the second magnetically attractive member with the second base; and*

*cooperating orientation members configured to rotationally orient the faucet sprayhead relative to the faucet spout for locating a user input for a user.*

*79. The faucet of claim 78, wherein the magnetic coupling requires between 2.0 pounds and 12.0 pounds of force to pull the faucet sprayhead from the faucet spout.*

*80. The faucet of claim 79, wherein the magnetic coupling requires between 3.0 pounds and 8.0 pounds of force to pull the faucet sprayhead from the faucet spout.*

*81. The faucet of claim 78, wherein at least one of the first magnetically attractive member and the second magnetically attractive member has a magnetic field of between 400 gauss and 2,000 gauss tested at a distance of 0.090 inches.*

*82. The faucet of claim 78, wherein the magnetic coupling includes a coupling surface having an area of between 0.4 square inches and 2.0 square inches.*

*83. The faucet of claim 78, wherein:*

*when the faucet sprayhead is connected to the faucet spout, the first magnetically attractive member and the second magnetically attractive member are disposed adjacent to one another, and a central axis of the first magnetically attractive member is coaxial with a central axis of the second magnetically attractive member, the first magnetically attractive member and the second magnetically attractive member form a magnetic connection comprising an attractive magnetic force acting between the first magnetically attractive member and the second magnetically attractive member, and the magnetic connection is operable to maintain an attachment between the faucet sprayhead and the faucet spout; and*

*when the faucet sprayhead is disconnected from the faucet spout, the second magnetically attractive member is disposed outside of the elongate passageway of the faucet spout in a spaced relationship to the outlet end of the elongate passageway of the faucet spout such that the magnetic connection is inoperable to maintain the attachment between the faucet sprayhead and the faucet spout.*

*84. The faucet of claim 83, wherein when the faucet sprayhead is connected to the faucet spout, the second magnetically attractive member is disposed within the elongate passageway.*

*85. The faucet of claim 83, wherein when the magnetic connection is operable to maintain the attachment between the faucet sprayhead and the faucet spout, the magnetic coupling does not prohibit the faucet sprayhead from rotating relative to the faucet spout about the central axis of the second magnetically attractive member.*

*86. The faucet of claim 78, wherein the first magnetically attractive member is supported in the faucet spout in a ring arrangement to define an opening, and the water supply line comprises a tube passing through the opening of the first magnetically attractive member.*

*87. The faucet of claim 78, wherein:*

*at least one of the first magnetically attractive member and the second magnetically attractive member comprises a magnet and a backing member; and*

*the at least one of the first magnetically attractive member and the second magnetically attractive member has a magnetic field of between 400 and 2,000 gauss tested at a distance of 0.090 inches.*

*88. The faucet of claim 78, wherein:*

*the first magnetically attractive member comprises a first magnet and a first backing member; and*

*the first base comprises a polymer material molded over at least a portion of the first magnet and the first backing member.*

*89. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet; and*

*a magnetic coupling detachably connecting the faucet sprayhead to the faucet spout, the magnetic coupling comprising:*

*a first coupling member supported by the faucet spout comprising a base portion formed from a non-magnetic*

*material and a first magnetically attractive member, wherein the base portion is disposed in the elongate passageway of the faucet spout;*

*a second coupling member supported for movement with the faucet sprayhead and comprising a second magnetically attractive member;*

*cooperating orientation members configured to rotationally orient the faucet sprayhead relative to the faucet spout for locating a user input for a user;*

*wherein when the faucet sprayhead is connected to the faucet spout, the first magnetically attractive member and the second magnetically attractive member are disposed adjacent to one another, the first magnetically attractive member and the second magnetically attractive member form a magnetic connection comprising an attractive magnetic force acting between the first magnetically attractive member and the second magnetically attractive member, and wherein the magnetic connection is operable to maintain an attachment between the faucet sprayhead and the faucet spout against a pull force on the faucet sprayhead for detaching the faucet sprayhead from the faucet spout of between about 2 pounds force and 12 pounds force; and*

*at least one of the first magnetically attractive member and the second magnetically attractive member comprises a magnet and a backing member; and*

*the at least one of the first magnetically attractive member and the second magnetically attractive member has a magnetic field of between 40 gauss and 2,000 gauss tested at a distance of 0.090 inches.*

*90. The faucet of claim 89, wherein the first magnetically attractive member is attached to the base portion at a location that is spaced from the outlet end of the elongate passageway of the faucet spout.*

*91. The faucet of claim 89, wherein:*

*at least one of the first magnetically attractive member and the second magnetically attractive member comprises a magnet; and*

*the magnet has a magnetic field of between 400 gauss and 2,000 gauss tested at a distance of 0.0900 inches.*

*92. The faucet of claim 91 wherein the magnet has a magnetic field of between 500 gauss and 1,000 gauss tested at a distance of 0.090 inches.*

*93. The faucet of claim 89 wherein*

*the first magnetically attractive member comprises a first magnet and the second magnetically attractive member comprises a second magnet; and*

*each of the first magnet and the second magnet has a magnetic field of between 400 gauss and 2,000 gauss tested at a distance of 0.0900 inches.*

*94. The faucet of claim 93 wherein each of the first magnet and the second magnet has a magnetic field of between 500 gauss and 1,000 gauss tested at a distance of 0.0900 inches.*

*95. The faucet of claim 89, further comprising a coupling portion coupling the first magnetically attractive member to the base portion.*

*96. The faucet of claim 95, wherein the coupling portion includes a lip on one of the base portion and the first magnetically attractive member, the lip engaging a surface on the other of the first magnetically attractive member and the base portion.*

*97. The faucet of claim 89, wherein the first magnetically attractive member is disposed entirely within the elongate passageway of the faucet spout, and the water supply line passes through the first coupling member.*

*98. The faucet of claim 89, wherein the pull force on the faucet sprayhead for detaching the sprayhead from the faucet spout is between 3.0 pounds and 8.0 pounds of force.*

*99. The faucet of claim 89, wherein:*

*when the faucet sprayhead is connected to the faucet spout, the second magnetically attractive member is disposed within the elongate passageway, and the first magnetically attractive member and the second magnetically attractive member are disposed adjacent to one another, the first magnetically attractive member and the second magnetically attractive member form a magnetic connection comprising an attractive magnetic force acting between the first magnetically attractive member and the second magnetically attractive member, and the magnetic connection is operable to maintain an attachment between the faucet sprayhead and the faucet spout; and*

*when the faucet sprayhead is disconnected from the faucet spout, the second magnetically attractive member is disposed outside of the elongate passageway of the faucet*

*spout in a spaced relationship to the outlet end of the elongate passageway of the faucet spout.*

*100. The faucet of claim 99, wherein when the magnetic connection is operable to maintain the attachment between the faucet sprayhead and the faucet spout, the magnetic coupling does not prohibit the faucet sprayhead from rotating relative to the faucet spout about the central axis of the second magnetically attractive member.*

*101. The faucet of claim 89, wherein the first magnetically attractive member is supported by the faucet spout in a ring arrangement to define an opening, and the water supply line comprises a tube passing through the opening of the first magnetically attractive member.*

*102. The faucet of claim 101, wherein the first magnetically attractive member includes a continuous annular body.*

*103. The faucet of claim 89, wherein the first magnetically attractive member comprises a magnet, and the base portion is formed from a polymer.*

*104. The faucet of claim 89, wherein, when the faucet sprayhead is connected to the faucet spout, the second magnetically attractive member is disposed within the elongate passageway, the first magnetically attractive member and the second magnetically attractive member are disposed adjacent to one another, and a central axis of the first magnetically attractive member is coaxial with a central axis of the second magnetically attractive member.*

*105. The faucet of claim 104, wherein:*

*the first magnetically attractive member has a lower surface;*

*the second magnetically attractive member has an upper surface; and*

*when the faucet sprayhead is connected to the faucet spout, the lower surface of the first magnetically attractive member faces the upper surface of the second magnetically attractive member.*

*106. The faucet of claim 89, wherein the second coupling member is disposed outside of the interior space of the outer shell of the faucet sprayhead.*

*107. The faucet of claim 89, wherein the base portion of the first coupling member comprises a polymer material molded over at least a portion of the first magnetically attractive member to at least partially encapsulate the first magnetically attractive member with the base portion.*

*108. The faucet of claim 107, wherein the second coupling member comprises a polymer material molded over at least a portion of the second magnetically attractive member.*

*109. The faucet of claim 108, wherein the second magnetically attractive member comprises a second magnet and a second backing member.*

*110. The faucet of claim 107 wherein the first magnetically attractive member comprises a first magnet and a first backing member.*

*111. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet; and*

*a magnetic coupling detachably connecting the faucet sprayhead to the faucet spout, the magnetic coupling comprising:*

*a first coupling member supported by the faucet spout comprising a base portion formed from a non-magnetic material and a first magnetically attractive member, wherein the base portion is disposed in the elongate passageway of the faucet spout;*

*a second coupling member supported for movement with the faucet sprayhead and comprising a second magnetically attractive member;*

*cooperating orientation members configured to rotationally orient the faucet sprayhead relative to the faucet spout for locating a user input for a user;*

*wherein when the faucet sprayhead is connected to the faucet spout, the first magnetically attractive member and the second magnetically attractive member are disposed adjacent to one another, the first magnetically attractive member and the second magnetically attractive member form a magnetic connection comprising an attractive magnetic force acting between the first magnetically attractive member and the second magnetically attractive member, and wherein the magnetic connection is operable to maintain an attachment between the faucet sprayhead and the faucet spout against a pull force on the faucet sprayhead for detaching the faucet sprayhead from the faucet spout of between about 2 pounds force and 12 pounds force;*

*the first magnetically attractive member comprises a first magnet and a first backing member;*

*the second magnetically attractive member comprises a second magnet and a second backing member; and*

*wherein each of the first magnetically attractive member and the second magnetically attractive member has a magnetic field of between 400 gauss and 2,000 gauss tested at a distance of 0.0900 inches.*

*112. The faucet of claim 111, wherein the base portion comprises a polymer material molded over at least a portion of the first magnet and the first backing member.*

*113. The faucet of claim 111, wherein the second coupling member comprises a polymer material molded over at least a portion of the second magnet and the second backing member.*

*114. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising:*

*a first coupling member supported by the faucet spout comprising a base portion formed from a non-magnetic material and a first magnetically attractive member, wherein the base portion is disposed in the elongate passageway of the faucet spout;*

*a second coupling member supported for movement with the faucet sprayhead and comprising a second magnetically attractive member;*

*cooperating orientation members configured to rotationally orient the faucet sprayhead relative to the faucet spout for locating a user input for a user;*

*wherein when the faucet sprayhead is connected to the faucet spout, the first magnetically attractive member and the second magnetically attractive member are disposed adjacent to one another, the first magnetically attractive member and the second magnetically attractive member form a magnetic connection comprising an attractive magnetic force acting between the first magnetically attractive member and the second magnetically attractive member, and wherein the magnetic connection is operable to maintain an attachment between the faucet sprayhead and the faucet spout against a pull force on the faucet sprayhead for detaching the faucet sprayhead from the faucet spout of between about 2 pounds force and 12 pounds force; and*

*wherein at least one of the first coupling member includes an overmold over the first magnetically attractive member, and the second coupling member includes an overmold over the second magnetically attractive member.*

*115. A faucet comprising:*

*a faucet spout defining an elongate passageway having an outlet end;*

*a water supply line passing through the elongate passageway of the faucet spout and moveable relative to the outlet end of the faucet spout;*

*a pull-out faucet sprayhead detachably connected to the faucet spout and comprising an outer shell defining an interior space, a waterway comprising a receiving end and a dispensing end, and a water outlet;*

*wherein the receiving end of the waterway is fluidly coupled to the water supply line and the dispensing end of the waterway is fluidly coupled to the water outlet;*

*wherein the water supply line, the waterway and the water outlet together define a fluid path through the faucet;*

*a magnetic coupling detachably connecting the faucet sprayhead to the faucet spout, the magnetic coupling comprising:*

*a first coupling member supported by the faucet spout comprising a base portion formed from a non-magnetic*

*material and a first magnetically attractive member, wherein the base portion is disposed in the elongate passageway of the faucet spout;*

*a second coupling member supported for movement with the faucet sprayhead and comprising a second magnetically attractive member;*

*cooperating orientation members configured to rotationally orient the faucet sprayhead relative to the faucet spout for locating a user input for a user;*

*wherein when the faucet sprayhead is connected to the faucet spout, the first magnetically attractive member and the second magnetically attractive member are disposed adjacent to one another, the first magnetically attractive member and the second magnetically attractive member form a magnetic connection comprising an attractive magnetic force acting between the first magnetically attractive member and the second magnetically attractive member, and wherein the magnetic connection is operable to maintain an attachment between the faucet sprayhead and the faucet spout against a pull force on the faucet sprayhead for detaching the faucet sprayhead from the faucet spout of between about 2 pounds force and 12 pounds force; and*

*wherein the second coupling member is disposed inside of the interior space of the outer shell of the faucet sprayhead.*

*116. The faucet of claim 115, wherein the second coupling member comprises a polymer material molded over at least a portion of the second magnetically attractive member.*

*117. The faucet of claim 116, wherein the second magnetically attractive member comprises a second magnet and a second backing member.*

* * * * *